(12) United States Patent
Shirosaki et al.

(10) Patent No.: US 10,431,090 B2
(45) Date of Patent: Oct. 1, 2019

(54) PEDESTRIAN-VEHICLE COMMUNICATION SYSTEM

(71) Applicant: PANASONIC CORPORATION, Osaka (JP)

(72) Inventors: Yoshimasa Shirosaki, Kanagawa (JP); Hiroaki Sudo, Kanagawa (JP); Yoshiyuki Okubo, Kanagawa (JP); Tsuyoshi Ueno, Kanagawa (JP)

(73) Assignee: PANASONIC CORPORATION, Osaka (JP)

( * ) Notice: Subject to any disclaimer, the term of this patent is extended or adjusted under 35 U.S.C. 154(b) by 54 days.

(21) Appl. No.: 15/822,601

(22) Filed: Nov. 27, 2017

(65) Prior Publication Data

US 2018/0122240 A1 May 3, 2018

Related U.S. Application Data

(63) Continuation of application No. PCT/JP2016/001024, filed on Feb. 25, 2016.

(30) Foreign Application Priority Data

May 28, 2015 (JP) .................................. 2015-108200

(51) Int. Cl.
*G08G 1/16* (2006.01)
*B60R 21/00* (2006.01)
(Continued)

(52) U.S. Cl.
CPC ............. *G08G 1/161* (2013.01); *B60R 21/00* (2013.01); *G08G 1/166* (2013.01); *H04M 1/00* (2013.01);
(Continued)

(58) Field of Classification Search
CPC ............ G08G 1/161; G08G 1/09; G08G 1/16; G08G 1/166; H04W 4/70; H04W 4/80;
(Continued)

(56) References Cited

U.S. PATENT DOCUMENTS

| 6,389,125 | B1 * | 5/2002 | Ubowski ................. H04M 1/57 379/142.01 |
| 2002/0132644 | A1 | 9/2002 | Mellor et al. |
| 2011/0237315 | A1 | 9/2011 | Seeor et al. |

FOREIGN PATENT DOCUMENTS

| JP | 2007-188141 | | 7/2007 |
| JP | 2007188141 | * | 7/2007 |

(Continued)

OTHER PUBLICATIONS

International Search Report (ISR) from International Searching Authority (Japan Patent Office) in International Pat. Appl. No. PCT/JP2016/001024, dated Apr. 26, 2016.

*Primary Examiner* — Edward F Urban
*Assistant Examiner* — Angelica M Perez
(74) *Attorney, Agent, or Firm* — Greenblum & Bernstein, P.L.C.

(57) ABSTRACT

Pedestrian terminal device that can save power consumption. The pedestrian terminal device carried by a pedestrian is provided with an operation mode selector for selecting one of a principal terminal operation mode wherein a pedestrian-vehicle communication with an in-vehicle terminal device is performed representing other pedestrian terminal devices, and an in-group terminal operation mode wherein a short-range wireless communication of a shorter range and a smaller power output than the pedestrian-vehicle communication is performed with another pedestrian terminal device operating in the principal terminal operation mode. Because the pedestrian terminal device in which the principal terminal operation mode is selected communicates (Continued)

with other pedestrian terminal devices operating in the in-group terminal operation mode via the short-range wireless communication of a shorter-range and a smaller power output than the pedestrian-vehicle communication, the power consumption of the pedestrian terminal device can be saved.

18 Claims, 15 Drawing Sheets

(51) Int. Cl.
| | |
|---|---|
| *H04M 1/00* | (2006.01) |
| *H04W 4/70* | (2018.01) |
| *H04W 4/80* | (2018.01) |
| *H04W 4/02* | (2018.01) |
| *H04W 4/08* | (2009.01) |
| *H04W 4/40* | (2018.01) |
| *H04W 8/00* | (2009.01) |
| *H04M 1/73* | (2006.01) |
| *H04W 84/20* | (2009.01) |
| *H04W 88/04* | (2009.01) |
| *H04W 4/06* | (2009.01) |
| *H04M 1/725* | (2006.01) |

(52) U.S. Cl.
CPC .............. *H04W 4/023* (2013.01); *H04W 4/08* (2013.01); *H04W 4/40* (2018.02); *H04W 4/70* (2018.02); *H04W 4/80* (2018.02); *H04W 8/005* (2013.01); *H04M 1/7253* (2013.01); *H04M 1/73* (2013.01); *H04W 4/02* (2013.01); *H04W 4/06* (2013.01); *H04W 84/20* (2013.01); *H04W 88/04* (2013.01); *Y02D 70/10* (2018.01); *Y02D 70/142* (2018.01); *Y02D 70/144* (2018.01); *Y02D 70/164* (2018.01)

(58) Field of Classification Search
CPC ....... H04W 4/023; H04W 4/046; H04W 4/08; H04W 84/20; H04W 88/04; H04M 1/00; H04M 1/73; Y02D 70/10
USPC ..... 455/41.1–41.3, 659.2, 567, 575.9, 552.1, 455/553.1, 440, 404.2
See application file for complete search history.

(56) References Cited

FOREIGN PATENT DOCUMENTS

| | | | |
|---|---|---|---|
| JP | 2009-045956 | | 3/2009 |
| JP | 2009045956 | * | 3/2009 |
| JP | 2009-206803 | | 9/2009 |
| JP | 2009206803 | * | 9/2009 |
| JP | 2011-253403 | | 12/2011 |
| JP | 2011253403 | * | 12/2011 |
| JP | 4876628 | | 2/2012 |
| JP | 2013-009027 | | 1/2013 |
| JP | 2013009027 | * | 1/2013 |

* cited by examiner

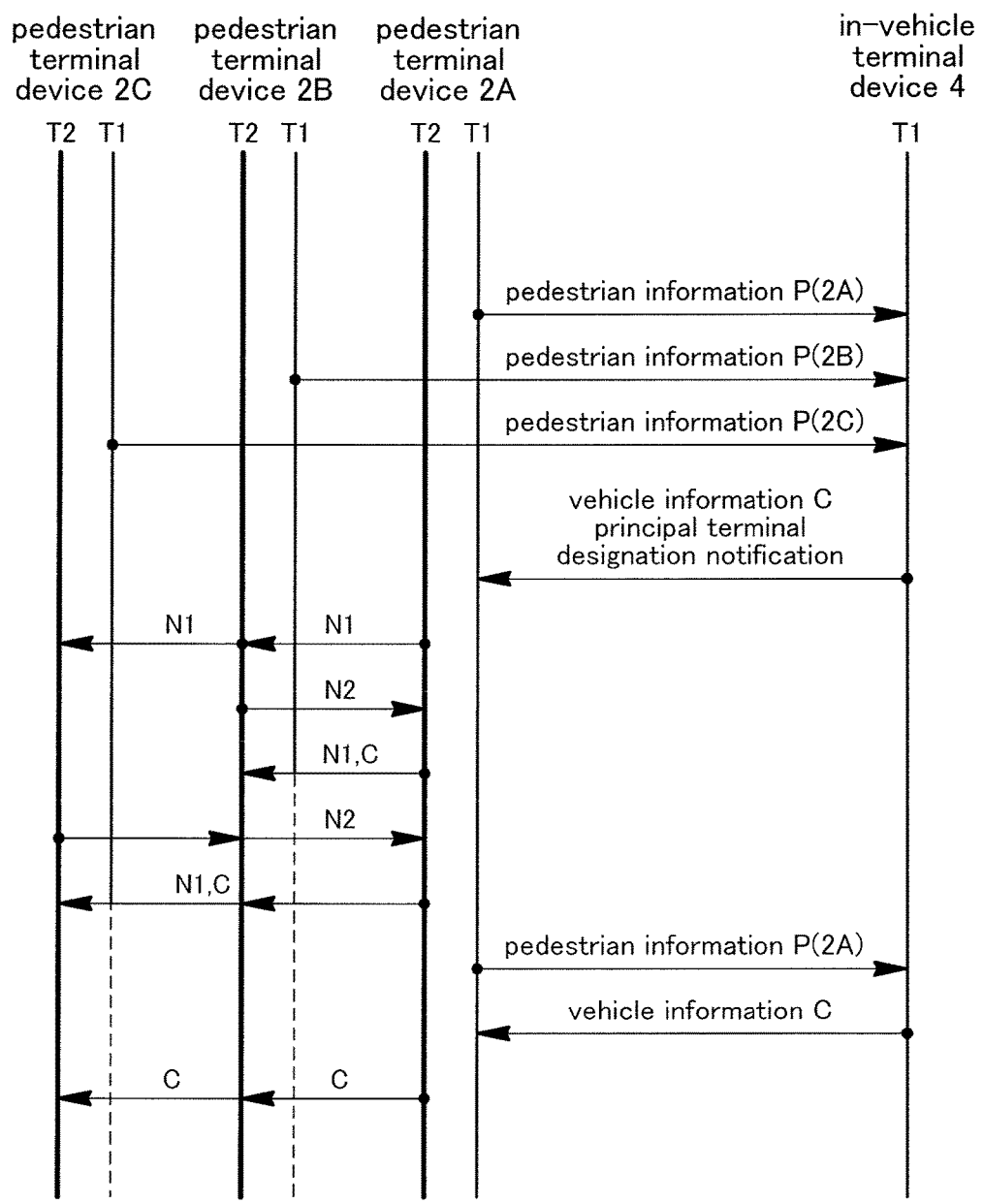

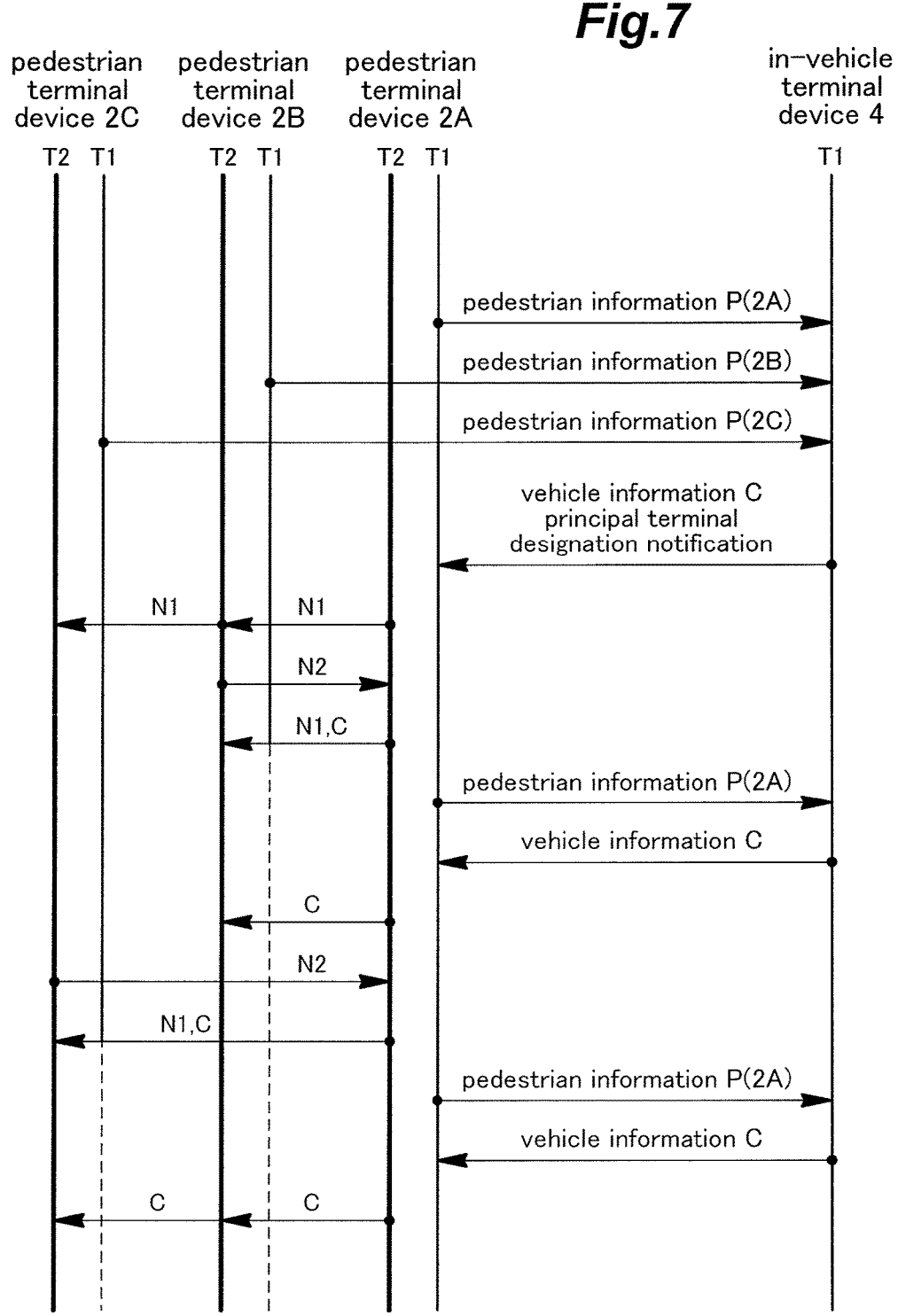

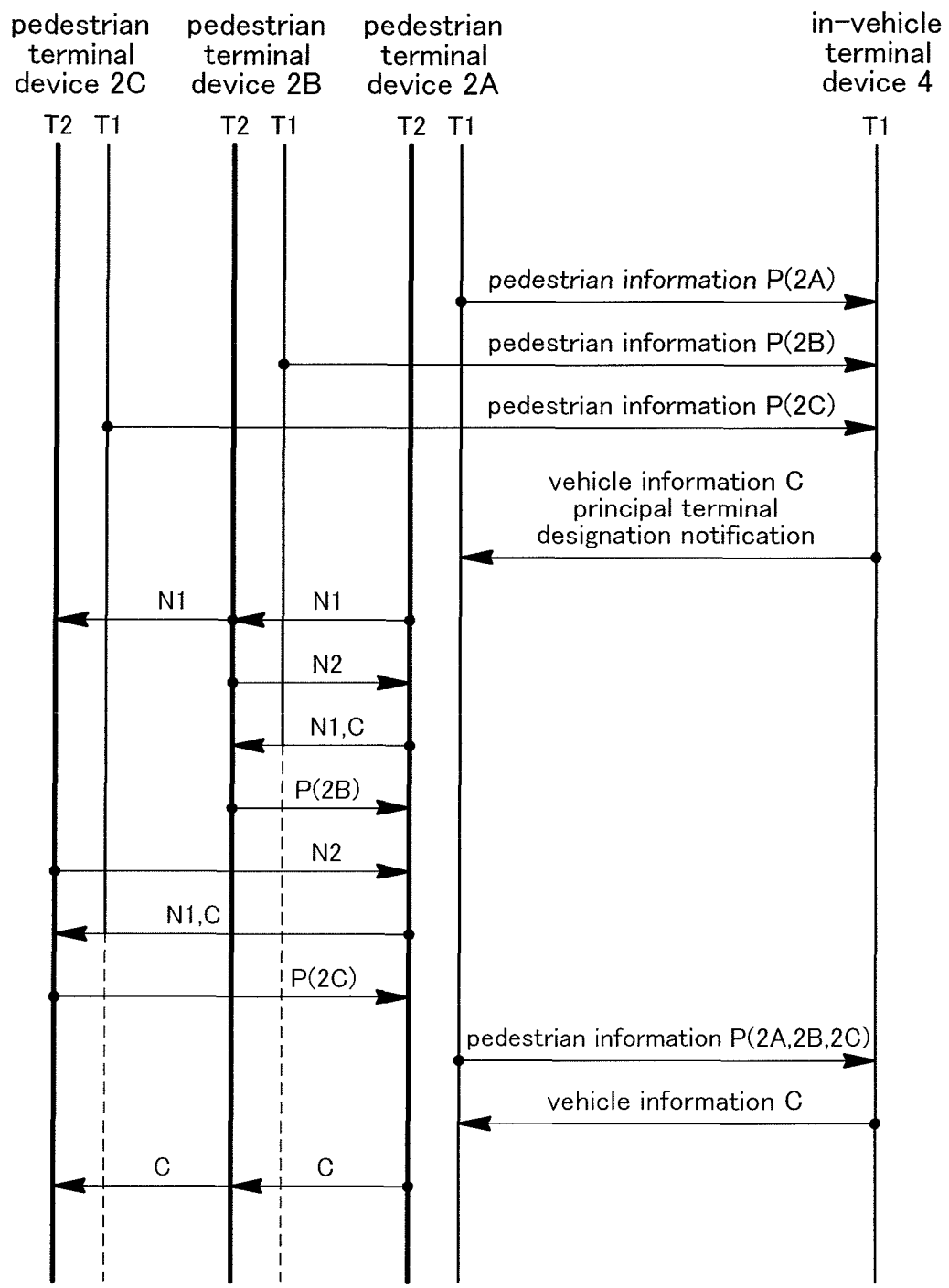

Fig.9 pedestrian information transmitted
from principal terminal to in-vehicle terminal

|  | information contents |
|---|---|
| pedestrian information (1) | pedestrian terminal identification tag (2A) |
| | position information (latitude, longitude, elevation) |
| | traveling direction |
| | traveling speed |
| | ... |
| pedestrian information (2) | pedestrian terminal identification tag (2B) |
| | position information (latitude, longitude, elevation) |
| | traveling direction |
| | traveling speed |
| | ... |
| pedestrian information (3) | pedestrian terminal identification tag (2C) |
| | position information (latitude, longitude, elevation) |
| | traveling direction |
| | traveling speed |
| | ... | group configuration   rectangular group configuration   elliptic (circular)

Fig.11 group information transmitted
from principal terminal to in-vehicle terminal

|  |  information contents |
| --- | --- |
| pedestrian information (principal terminal) | position information (latitude, longitude, elevation) |
| | traveling direction |
| | traveling speed |
| | ... |
| group information | group configuration (rectangular, elliptic, etc.) |
| | group length |
| | group width |
| | group position (latitude, longitude, elevation of center or head) |
| | traveling direction |
| | traveling speed |
| | ... |

PEDESTRIAN-VEHICLE COMMUNICATION SYSTEM

CROSS-REFERENCE TO RELATED APPLICATIONS

This application is a Continuation of International Patent Application No. PCT/JP2016/001024 filed Feb. 25, 2016, which claims priority of Japan Application No. JP 2015-108200 filed May 28, 2015, the disclosures of which are expressly incorporated by reference herein in their entireties.

TECHNICAL FIELD

The present invention relates to a pedestrian terminal device carried by a pedestrian for performing a pedestrian-vehicle communication with an in-vehicle terminal device mounted on a vehicle, an in-vehicle terminal device mounted on a vehicle for performing a pedestrian-vehicle communication with a pedestrian terminal device carried by a pedestrian, a pedestrian-vehicle communication system, and a pedestrian-vehicle communication method.

BACKGROUND ART

According to the Traffic Safety White Paper (published by the Ministry of Land, Infrastructure, Transport and Tourism of Japan), the number of traffic accidents has maintained a decreasing tendency in recent years, but it is notable that the accidents involving pedestrians account for a largest part of the number. With the aim of protecting pedestrians from traffic accidents, research and development efforts have been directed to the use of a pedestrian-vehicle communication system as a part of a traffic safety assist wireless communication system of the ITS (Intelligent Transport System).

In a pedestrian-vehicle communication system, each traveling object (such as a pedestrian and a vehicle) carries a pedestrian-vehicle communication device to acquire information (current positions, traveling directions, traveling speeds, etc.) from other traveling objects (such as pedestrians and vehicles) each carrying a pedestrian-vehicle communication device, and broadcasts information on itself. Based on the information received from other pedestrian-vehicle communication devices and the information on itself, each traveling object can prevent traffic accidents.

However, since the broadcast of information by each traveling object is performed on one channel using the frequency of 700 MHz allocated for the ITS, in a crowded area or in a busy street, communication difficulties and communication delays are likely to occur due to line congestion. In order to mitigate the influences of such line congestion, a system has been proposed wherein, when a plurality of pedestrian-vehicle communication devices carried by pedestrians (pedestrian terminal devices) are located close to each other, a pedestrian terminal group is formed, and a pedestrian terminal device representing the group (principal terminal) is designated so that the principal terminal performs a pedestrian-vehicle communication with the pedestrian-vehicle terminal devices carried by vehicles (in-vehicle terminal devices) by representing the group. See JP4876628B2 and JP2011-253403A, for example.

SUMMARY OF THE INVENTION

Task to be Accomplished by the Invention

According to the prior art disclosed in Patent Documents 1 and 2, however, since the principal terminal communicates with the pedestrian terminal devices of the same group via a pedestrian-vehicle communication, the non-principal pedestrian terminal devices use up the batteries thereof in the same way as in a usual pedestrian-vehicle communication. Since the battery of each pedestrian-vehicle communication device carried by each pedestrian (pedestrian terminal device) has a limited capacity, it is desirable if, when a pedestrian terminal group is formed, the power consumption of the pedestrian terminal devices other than the principal terminal can be reduced so that the pedestrian terminal devices may be used for a longer period of time.

The present invention was made in view of such a problem of the prior art, and has a primary object to provide a pedestrian terminal device, an in-vehicle terminal device, a pedestrian-vehicle communication system, and a pedestrian-vehicle communication method that can save power consumption of the pedestrian terminal device.

Means to Accomplish the Task

To achieve such an object, the present invention provides a pedestrian terminal device configured to be carried by a pedestrian for performing a pedestrian-vehicle communication with an in-vehicle terminal device mounted on a vehicle, comprising: a pedestrian-vehicle communicator for performing a pedestrian-vehicle communication with the in-vehicle terminal device; a short-range wireless communicator for performing a pedestrian-pedestrian communication of a shorter range and a smaller power output than the pedestrian-vehicle communication with another pedestrian terminal device; and an operation mode selector for selecting one of a principal terminal operation mode wherein the pedestrian-vehicle communication with the in-vehicle terminal device is performed representing other pedestrian terminal devices, and an in-group terminal operation mode wherein the short-range wireless communication is performed with another pedestrian terminal device operating in the principal terminal operation mode; when the operation mode selector has selected the principal terminal operation mode, the pedestrian terminal device transmitting a principal terminal communication status notification including position information on the own pedestrian terminal device to other pedestrian terminal devices, upon receiving principal terminal communication request notifications from the other pedestrian terminal devices in response to the principal terminal communication status notification, computing distances to the other pedestrian terminal devices based on position information on the other pedestrian terminal devices contained in the principal terminal communication request notifications; transmitting to those pedestrian terminal devices located within a predetermined distance from the own pedestrian terminal device a principal terminal communication status notification containing an ID of the other pedestrian terminal devices located within the predetermined distance, and performing a pedestrian-vehicle communication with the in-vehicle terminal device, representing the other pedestrian terminal devices located within the predetermined distance.

Effect of the Invention

According to the present invention, the pedestrian terminal device operating in the principal terminal operation mode can communicate with other pedestrian terminal devices via the short-range wireless communication of a shorter range and a smaller power output than the pedestrian-vehicle communication so that power saving can be achieved. In addition, since other pedestrian terminal devices do not need a pedestrian-vehicle communication with the in-vehicle terminal device, power saving can be achieved.

BRIEF DESCRIPTION OF THE DRAWINGS

FIG. 6 is a control sequence diagram of pedestrian terminal devices and an in-vehicle terminal device according to a first embodiment of the present invention;

FIG. 7 is a similar control sequence diagram according to a second embodiment of the present invention;

FIG. 8 is a similar control sequence diagram according to a third embodiment of the present invention;

FIG. 9 is a table showing the contents of pedestrian terminal information transmitted from the principal terminal device to the in-vehicle terminal device;

FIG. 11 is a table showing the contents of group information transmitted from the principal terminal device to the in-vehicle terminal device;

DESCRIPTION OF THE PREFERRED EMBODIMENT(S)

Figure 1:
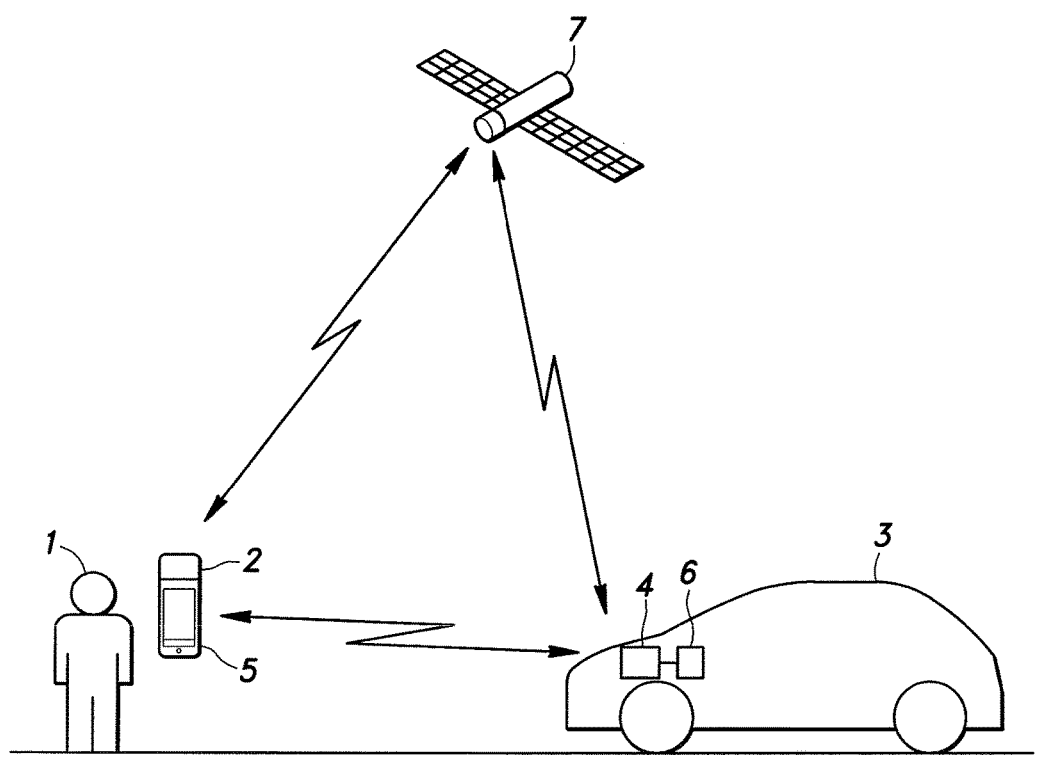
FIG. 1 is a schematic diagram of an example of a pedestrian-vehicle communication system according to the present invention.

To achieve such an object, a first aspect of the present invention provides a pedestrian terminal device configured to be carried by a pedestrian for performing a pedestrian-vehicle communication with an in-vehicle terminal device mounted on a vehicle, comprising: a pedestrian-vehicle communicator for performing a pedestrian-vehicle communication with the in-vehicle terminal device; a short-range wireless communicator for performing a pedestrian-pedestrian communication of a shorter range and a smaller power output than the pedestrian-vehicle communication with another pedestrian terminal device; and an operation mode selector for selecting one of a principal terminal operation mode wherein the pedestrian-vehicle communication with the in-vehicle terminal device is performed representing other pedestrian terminal devices, and an in-group terminal operation mode wherein the short-range wireless communication is performed with another pedestrian terminal device operating in the principal terminal operation mode; when the operation mode selector has selected the principal terminal operation mode, the pedestrian terminal device transmitting a principal terminal communication status notification including position information on the own pedestrian terminal device to other pedestrian terminal devices, upon receiving principal terminal communication request notifications from the other pedestrian terminal devices in response to the principal terminal communication status notification, computing distances to the other pedestrian terminal devices based on position information on the other pedestrian terminal devices contained in the principal terminal communication request notifications; transmitting to those pedestrian terminal devices located within a predetermined distance from the own pedestrian terminal device a principal terminal communication status notification containing an ID of the other pedestrian terminal devices located within the predetermined distance, and performing a pedestrian-vehicle communication with the in-vehicle terminal device, representing the other pedestrian terminal devices located within the predetermined distance.

According to the pedestrian terminal device of the first aspect of the invention, the pedestrian terminal device in which the principal terminal operation mode is selected can perform the pedestrian communication with the pedestrian terminal devices in which the in-group terminal operation mode is selected via a short-range wireless communication of a shorter range and a smaller power output than the pedestrian-vehicle communication, so that the power consumption of the pedestrian terminal device can be saved.

A second aspect of the present invention is characterized in that the operation mode selector is configured to select the in-group terminal operation mode when a principal terminal communication status notification containing an ID of the own pedestrian terminal device is received from one of the other pedestrian terminal devices.

According to the pedestrian terminal device of the second aspect of the invention, when a principal terminal status notification is received from another pedestrian terminal device, the operation mode selector can cause the pedestrian terminal device to operate in the in-group terminal operation mode.

A third aspect of the present invention is characterized in that the pedestrian terminal device further comprises a communication stop processor for stopping the pedestrian-vehicle communication performed by the pedestrian-vehicle communicator, the communication stop processor being configured to stop the pedestrian-vehicle communication performed by the pedestrian-vehicle communicator when the operation mode selector has selected the in-group terminal operation mode.

According to the pedestrian terminal device of the third aspect of the invention, the pedestrian terminal devices operating in the in-group terminal operation mode can stop the pedestrian-vehicle communication using the pedestrian-vehicle communicator so that the battery consumption of the pedestrian terminal devices can be minimized.

A fourth aspect of the present invention is characterized in that when the in-group terminal operation mode is canceled, the communication stop processor resumes the pedestrian-vehicle communication performed by the pedestrian-vehicle communicator.

According to the pedestrian terminal device of the fourth aspect of the invention, the pedestrian terminal device operating in the in-group terminal operation mode can resume the pedestrian-vehicle communication once the in-group terminal operation mode is canceled. Therefore, the pedestrian terminal device can resume the transmission of the pedestrian information of the own pedestrian terminal device to the in-vehicle terminal device without delay.

A fifth aspect of the present invention is characterized in that when the principal terminal operation mode is selected, the pedestrian terminal device is configured to monitor, at a regular interval, the principal terminal communication request notifications requesting the own pedestrian terminal device to operate in the principal terminal operation mode from the other pedestrian terminal devices operating in the in-group terminal operation mode, and to cancel the principal terminal operation mode upon failing to receive a principal terminal communication request notification for a predetermined time period.

According to the pedestrian terminal device of the fifth aspect of the invention, the pedestrian terminal device operating in the principal terminal operation mode can cancel the principal terminal operation mode when a principal terminal communication request notice has not been received from other pedestrian terminal devices operating in the in-group terminal operation mode for a predetermined period of time, whereby the principal terminal operation mode can be canceled at a prescribed timing.

A sixth aspect of the present invention is characterized in that when the in-group terminal operation mode is selected, the pedestrian terminal device is configured to monitor, at a regular interval, the principal terminal communication status notification from one of the other pedestrian terminal devices operating in the principal terminal operation mode, and to cancel the in-group terminal operation mode upon failing to receive a principal terminal communication status notification for the predetermined time period.

According to the pedestrian terminal device of the sixth aspect of the invention, the pedestrian terminal device operating in the in-group terminal operation mode can cancel the in-group terminal operation mode when a principal terminal communication status notification has not been received from another pedestrian terminal device operating in the principal terminal operation mode for a predetermined period of time, whereby the in-group terminal operation mode can be canceled at a prescribed timing.

A seventh aspect of the present invention is characterized in that when the principal terminal operation mode is selected, the pedestrian-pedestrian communicator receives pedestrian information including pedestrian position information from the other pedestrian terminal devices, and the pedestrian-vehicle communicator transmits the pedestrian information including pedestrian position information received from the other pedestrian terminal devices or group information containing in-group terminal information to the in-vehicle terminal device.

According to the pedestrian terminal device of the seventh aspect of the invention, the pedestrian terminal device in which the principal terminal operation mode is selected can receive pedestrian information including the position information from the pedestrian terminal devices operating in the in-group terminal operation mode, and transmit the received pedestrian information or group information containing in-group terminal information to the in-vehicle terminal device. Thereby, the in-vehicle terminal device can acquire information from the pedestrian terminal device operating in the principal terminal operation mode, and can perform safe driving by referring to the acquired information.

An eighth aspect of the present invention is characterized in that the operation mode selector is configured to select one of the principal terminal operation mode and the in-group terminal operation mode according to a manual input from a user.

According to the pedestrian terminal device of the eighth aspect of the invention, the operation mode selector can select the operation mode based on the manual setting entered by the user so that the principal terminal operation mode or the in-group terminal operation can be selected according to the desire of the user.

A ninth aspect of the present invention is characterized in that the operation mode selector is configured to select one of the principal terminal operation mode and the in-group terminal operation mode according to remaining battery charge information or battery charging information of the own pedestrian terminal device or the other pedestrian terminal devices.

According to the pedestrian terminal device of the ninth aspect of the invention, the principal terminal operation mode or the in-group terminal operation mode can be selected based on the remaining battery charge information or the buttery charging information of the own pedestrian terminal device or the other pedestrian terminal devices, so that a pedestrian terminal device with a large remaining battery charge or capable of receiving a supply of electric power from an external source can be chosen as a pedestrian terminal device operating in the principal terminal operation mode.

A tenth aspect of the present invention is characterized in that the operation mode selector is configured to select one of the principal terminal operation mode and the in-group terminal operation mode according to whether a user of the own pedestrian terminal device or users of the other pedestrian terminal devices are riding a walking assistance vehicle or a personal mobility vehicle, or whether the own pedestrian terminal device or the other pedestrian terminal devices are mounted on a walking assistance vehicle or a personal mobility vehicle.

According to the pedestrian terminal device of the tenth aspect of the invention, a pedestrian terminal device carried by a user riding a walking assistance vehicle or a personal mobility vehicle, or a pedestrian terminal device mounted on a walking assistance vehicle or a personal mobility vehicle can be switched to the principal terminal operation mode so, whereby a pedestrian terminal device that is capable of receiving a supply of electric power from the walking assistance vehicle or the personal mobility vehicle can be chosen as a pedestrian terminal device operating in the principal terminal operation mode.

An eleventh aspect of the present invention is characterized in that the operation mode selector is configured to select one of the principal terminal operation mode and the in-group terminal operation mode according to a command from a fixed terminal device positioned by a road received by the pedestrian-vehicle communicator or the pedestrian-pedestrian communicator.

According to the pedestrian terminal device of the eleventh aspect of the invention, the operation mode selector can select the principal terminal operation mode or the in-group terminal operation mode based on an instruction from the in-vehicle terminal device or a fixed terminal device positioned by the road so that the operation mode can be selected by various instructions from various sources such as the in-vehicle terminal device and fixed terminal device positioned by the road.

A twelfth aspect of the present invention is characterized in that the operation mode selector is configured to select the principal terminal operation mode when a principal terminal designation notification from the in-vehicle terminal device is received by the pedestrian-vehicle communicator.

According to the pedestrian terminal device of the twelfth aspect of the invention, the operation mode selector can cause the pedestrian terminal device to operate in the principal terminal operation mode when the pedestrian-vehicle communicator has received the principal terminal designation notification from the in-vehicle terminal device.

A thirteenth aspect of the present invention is characterized in that the pedestrian-vehicle communicator is configured to transmit attribute information regarding a use status of the own pedestrian terminal device to the in-vehicle terminal device.

According to the pedestrian terminal device of the thirteenth aspect of the invention, since the attribute information on the use status of the pedestrian terminal device can be transmitted to the in-vehicle terminal device, the in-vehicle terminal device is enabled to determine the pedestrian terminal device to be operated in the principal terminal operation mode based on the attribute information on the use status of the pedestrian terminal device.

A fourteenth aspect of the present invention is characterized in that the pedestrian-vehicle communicator is configured to transmit attribute information regarding a remaining battery charge of the own pedestrian terminal device to the in-vehicle terminal device.

According to the pedestrian terminal device of the fourteenth aspect of the invention, since the attribute information on the remaining battery charge of the pedestrian terminal device can be transmitted to the in-vehicle terminal device, the in-vehicle terminal device is enabled to determine the pedestrian terminal device to be operated in the principal terminal operation mode based on the attribute information on the remaining battery charge of the pedestrian terminal device.

A fifteenth aspect of the present invention provides a pedestrian-vehicle communication system, comprising: the pedestrian terminal device according to the first aspect of the present invention; and an in-vehicle terminal device mounted on a vehicle and configured to perform a pedestrian-vehicle communication with the pedestrian terminal device.

A sixteenth aspect of the invention provides a pedestrian-vehicle communication system, comprising: the pedestrian terminal devices according to the twelfth aspect of the invention; and an in-vehicle terminal device mounted on a vehicle and configured to determine a principal terminal that performs a pedestrian-vehicle communication representing other pedestrian terminal devices according to attribute information of the pedestrian terminal devices obtained via a pedestrian-vehicle communication with the pedestrian terminal devices.

A seventeenth aspect of the present invention provides a pedestrian-vehicle communication method to be executed by a pedestrian terminal device configured to be carried by a pedestrian to perform a pedestrian-vehicle communication with an in-vehicle terminal device mounted on a vehicle, comprising the steps of: selecting one of a principal terminal operation mode wherein the pedestrian-vehicle communication with the in-vehicle terminal device is performed representing other pedestrian terminal devices, and an in-group terminal operation mode wherein a short-range wireless communication of a shorter range and a smaller power output than the pedestrian-vehicle communication is performed with another pedestrian terminal device operating in the principal terminal operation mode; when the principal terminal operation mode is selected, transmitting a principal terminal communication status notification including position information on the own pedestrian terminal device to other pedestrian terminal devices; upon receiving principal terminal communication request notifications from the other pedestrian terminal devices in response to the principal terminal communication status notification, computing distances to the other pedestrian terminal devices based on position information on the other pedestrian terminal devices contained in the principal terminal communication request notifications; transmitting to those pedestrian terminal devices located within a predetermined distance from the own pedestrian terminal device a principal terminal communication status notification containing an ID of the other pedestrian terminal devices located within the predetermined distance, and performing a pedestrian-vehicle communication with the in-vehicle terminal device representing the other pedestrian terminal devices located within the predetermined distance.

An eighteenth aspect of the present invention further comprises the step of, upon receiving the principal terminal communication status notification including an ID of the own pedestrian terminal device from one of the other pedestrian terminal devices, selecting the in-group terminal operation mode.

Preferred embodiments of the present invention are described in the following with reference to the appended drawings.

FIG. 1 is a schematic diagram showing an example of the pedestrian-vehicle communication system according to the present invention. As shown in the drawing, a pedestrian 1 carries a portable pedestrian terminal device 2, and an in-vehicle terminal device 4 is mounted on a vehicle 3. The pedestrian terminal device 2 is integrally connected to a portable information terminal 5 such as a smartphone and a mobile phone, but may alternatively be internally incorporated in the portable information terminal 5. The in-vehicle terminal device 4 is integrally connected to a car navigation system 6, but may alternatively be internally incorporated in the car navigation system 6. The pedestrian terminal device 2 and the in-vehicle terminal device 4 can receive signals from a plurality of satellites 7 constituting a GPS (Global Positioning System) or QZSS (Quasi-Zenith Satellite System), and are provided with GPS functions that allow these devices to generate their own position information.

Figure 2A:
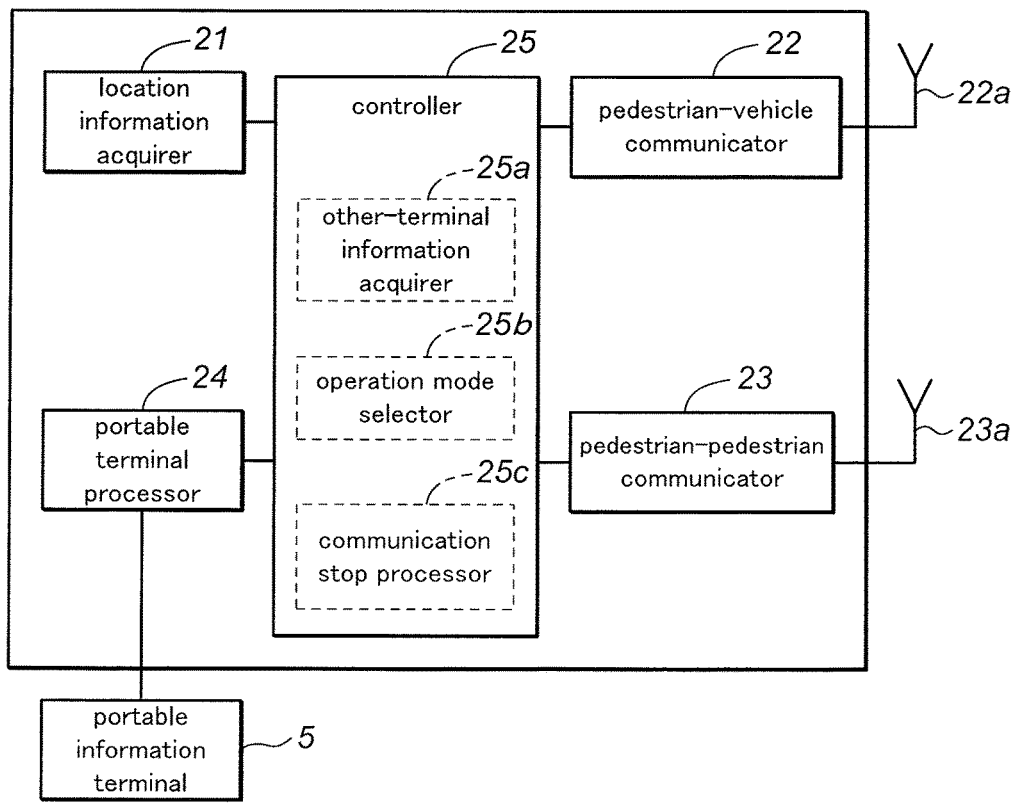
FIG. 2a is a simplified block diagram of a pedestrian terminal device.
Figure 2B:
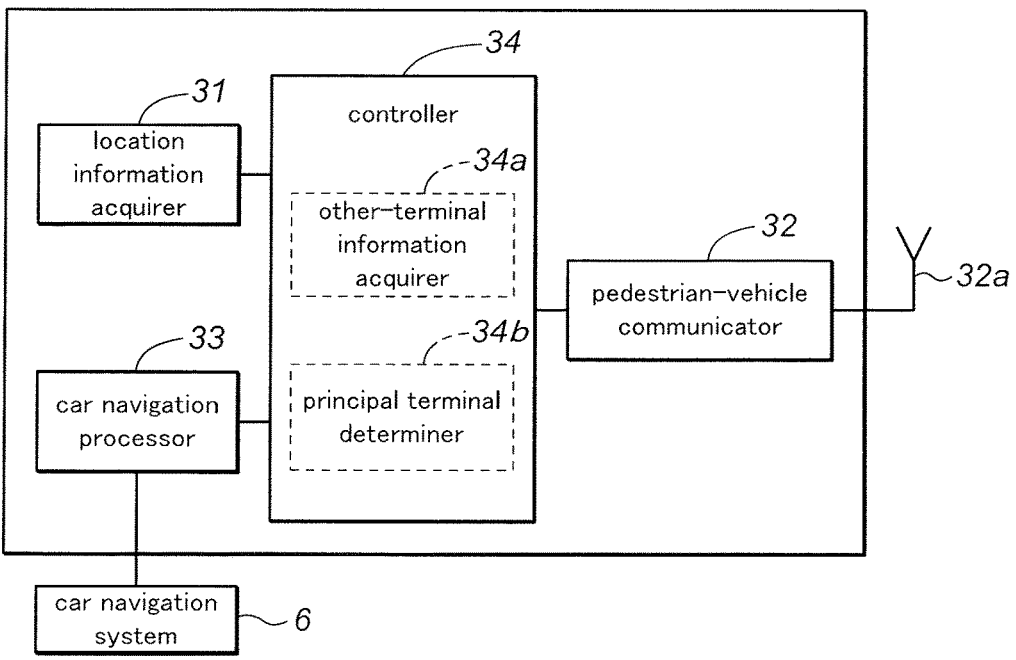
FIG. 2b is a simplified block diagram of an in-vehicle terminal device.

FIG. 2 (A) is a schematic block diagram of the pedestrian terminal device 2. The pedestrian terminal device 2 includes a location information acquirer 21 that receives signals from the satellites 7 to acquire the own position information, a pedestrian-vehicle communicator 22 that performs a pedestrian-vehicle communication with the in-vehicle terminal device 4 of the vehicle 3, a pedestrian-pedestrian communicator 23 that performs a short-range and low power wireless communication with other pedestrian terminal devices, a portable terminal processor 24 configured to process information that is passed between the portable terminal processor 24 and the portable information terminal 5, and a controller 25 for performing the overall control of the pedestrian terminal device 2 by executing a prescribed program on a CPU.

The controller 25 comprises an other terminal information acquirer 25a, an operation mode selector 25b, and a communication stop processor 25c which are formed as functional units realized by the computer program.

The pedestrian-vehicle communicator 22 broadcasts predetermined pedestrian information including its own position information (pedestrian terminal position information) by using a frequency for ITS (Intelligent Transport System) which consists of a safe driving support wireless system as a broadcast signal, and receives a radio signal transmitted from the in-vehicle terminal device 4. An antenna 22a for transmitting and receiving signals is connected to the pedestrian-vehicle communicator 22. When using the 700 MHz band as the frequency for the ITS communication, since the diffraction of the 700 MHz band is larger than that of the 5.8 GHz band (which is also available for the ITS), the radio wave can circumvent obstacles (buildings, large vehicles, etc.) so that a reliable information transmission is possible even when the pedestrian terminal device 2 and the in-vehicle terminal device 4 are not positioned on a common line of sight.

The pedestrian-pedestrian communicator 23 broadcasts prescribed pedestrian information including its own position information (pedestrian terminal position information) by using a known short-range wireless communication technology such as a wireless LAN (for example, Wi-Fi) and Bluetooth (registered trademark), and receives radio signals transmitted from the other pedestrian terminal devices 2. An antenna 23a for transmitting and receiving signals is connected to the pedestrian-pedestrian communicator 23. Although details will be described later, the pedestrian-pedestrian communicator 23 notifies the principal terminal communication status notification, the principal terminal communication request notification, and the vehicle information received from the in-vehicle terminal device 4 by the pedestrian-pedestrian communicator 23 can be transmitted to the other pedestrian terminal devices 2.

The pedestrian-pedestrian communicator 23 uses frequencies of 4 GHz/5 GHz band (wireless LAN standard) or 2.4 GHz band (Bluetooth (registered trademark)) to perform wireless communication over a distance of several meters to several tens of meters. Whereas the pedestrian-vehicle communication performed by the pedestrian-vehicle communicator 22 can cover a radius of about 100 m, the pedestrian-pedestrian communication performed by the pedestrian-pedestrian communicator 23 is a short-range wireless communication which covers a far smaller distance than the pedestrian-vehicle communicator 22. Hereinafter, the communication performed by the pedestrian-pedestrian communicator 23 is referred to as "short-range wireless communication". The short-range wireless communication performed by the pedestrian-pedestrian communicator 23 uses a power output of less than 10 mW (wireless LAN standard, Bluetooth (registered trademark) standard), and therefore consumes much less power than the pedestrian-vehicle communication performed by the pedestrian-vehicle communicator 22. In this manner, the pedestrian-pedestrian communicator 23 can perform a short-range, low-power wireless communication with other pedestrian terminal devices 2 using the short-range wireless communication technology. Note that the short-range wireless communication technology used in the pedestrian-pedestrian communicator 23 is not limited to the wireless LAN and Bluetooth (registered trademark), but other techniques or standards such as infrared communication may also be used.

The other terminal information acquirer 25a acquires information on other pedestrians 1 (pedestrian terminal devices 2) and other vehicles (other in-vehicle terminal devices 4). The acquired information is provided to the pedestrian 1 via the portable information terminal 5 as required.

The operation mode selector 25b selects either the principal terminal operation mode in which the pedestrian-vehicle communication is performed with the in-vehicle terminal device 4 by one of the pedestrian terminal devices in behalf of the remaining pedestrian terminal devices 2, or the in-group terminal operation mode in which a short-range wireless communication with the pedestrian terminal device 2 operating in the principal terminal operation mode is performed by the remaining pedestrian terminal devices 2.

When the in-group terminal operation mode is selected by the operation mode selector 25b of one of the pedestrian terminal devices 2, and the principal terminal communication status notification described below is received from another pedestrian terminal device 2, the communication stop processor 25c of this particular pedestrian terminal device 2 stops the pedestrian-vehicle communication by using the pedestrian-vehicle communicator 22. When the in-group terminal operation mode is canceled, the pedestrian-vehicle communication by the pedestrian-vehicle communicator 22 is resumed.

FIG. 2 (B) is a schematic block diagram of the in-vehicle terminal device 4. The in-vehicle terminal device 4 includes a location information acquirer 31 that receives signals from the satellites 7 and acquires its own position information, a pedestrian-vehicle communicator 32 that performs a pedestrian-vehicle communication with the pedestrian terminal devices 2, a car navigation processor 33 for processing information associated with the car navigation system 6, and a controller 34 for performing the overall control of the in-vehicle terminal device 4 by executing a program on a CPU, for example. The controller 34 comprises an other terminal information acquirer 34a and a principal terminal determiner 34b which are realized by the computer program.

The pedestrian-vehicle communicator 32 transmits predetermined vehicle information including its own position information (in-vehicle terminal position information) as a broadcasted radio signal, and also receives a wireless signal transmitted from the pedestrian terminal devices 2. The pedestrian-vehicle communicator 32 is connected to an antenna 32a for transmission and reception purposes.

The other terminal information acquirer 34a acquires information on the pedestrians 1 (pedestrian terminal devices 2) and other vehicles (other in-vehicle terminal devices 4). The acquired information is provided to the vehicle operator via the car navigation system 6 as required.

Based on the pedestrian information received from the pedestrian terminal devices 2, the principal terminal determiner 34b determines the pedestrian terminal device 2 that is to be operated in the principal terminal operation mode.

Figure 3:
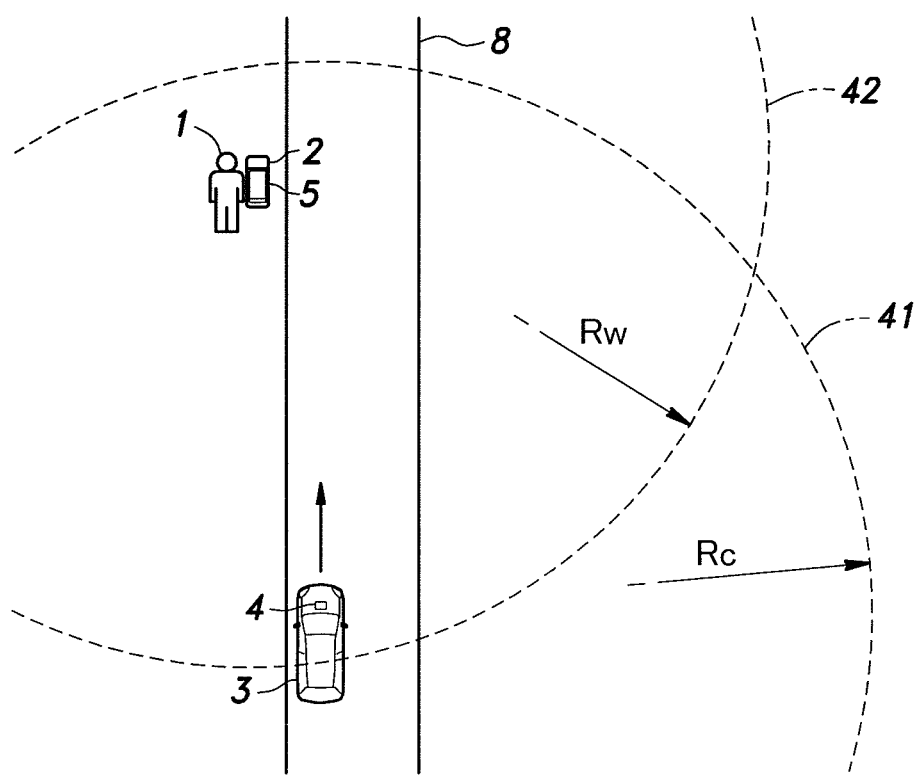
FIG. 3 is a diagram showing a positional relationship between a pedestrian and a vehicle.

FIG. 3 is a diagram showing the positional relationship between the pedestrian 1 and the vehicle 3 in a state where the pedestrian 1 is positioned beside a road 8 and the vehicle 3 is traveling on the road 8 toward the pedestrian 1. FIG. 3 also shows a pedestrian-vehicle communication range 41, or the range of the radio wave transmitted from the pedestrian-vehicle communicator 32 (see FIG. 2 (B)) of the in-vehicle terminal device 4, and a pedestrian-vehicle communication range 42 of the pedestrian terminal device 2, or the range of the radio wave transmitted from the pedestrian-vehicle communicator 22 of the pedestrian terminal device 2 (see FIG. 2A). The radii Rc and Rw of the pedestrian-vehicle communication ranges 41 and 42 depend on the magnitudes of the outputs of the pedestrian-vehicle communicators 22 and 32, but may be about 100 m in an area where no major obstructions are present.

First Embodiment

A first embodiment of the pedestrian-vehicle communication system of the present invention configured as described above is described in the following with reference to FIGS. 4 to 6.

Figure 4:
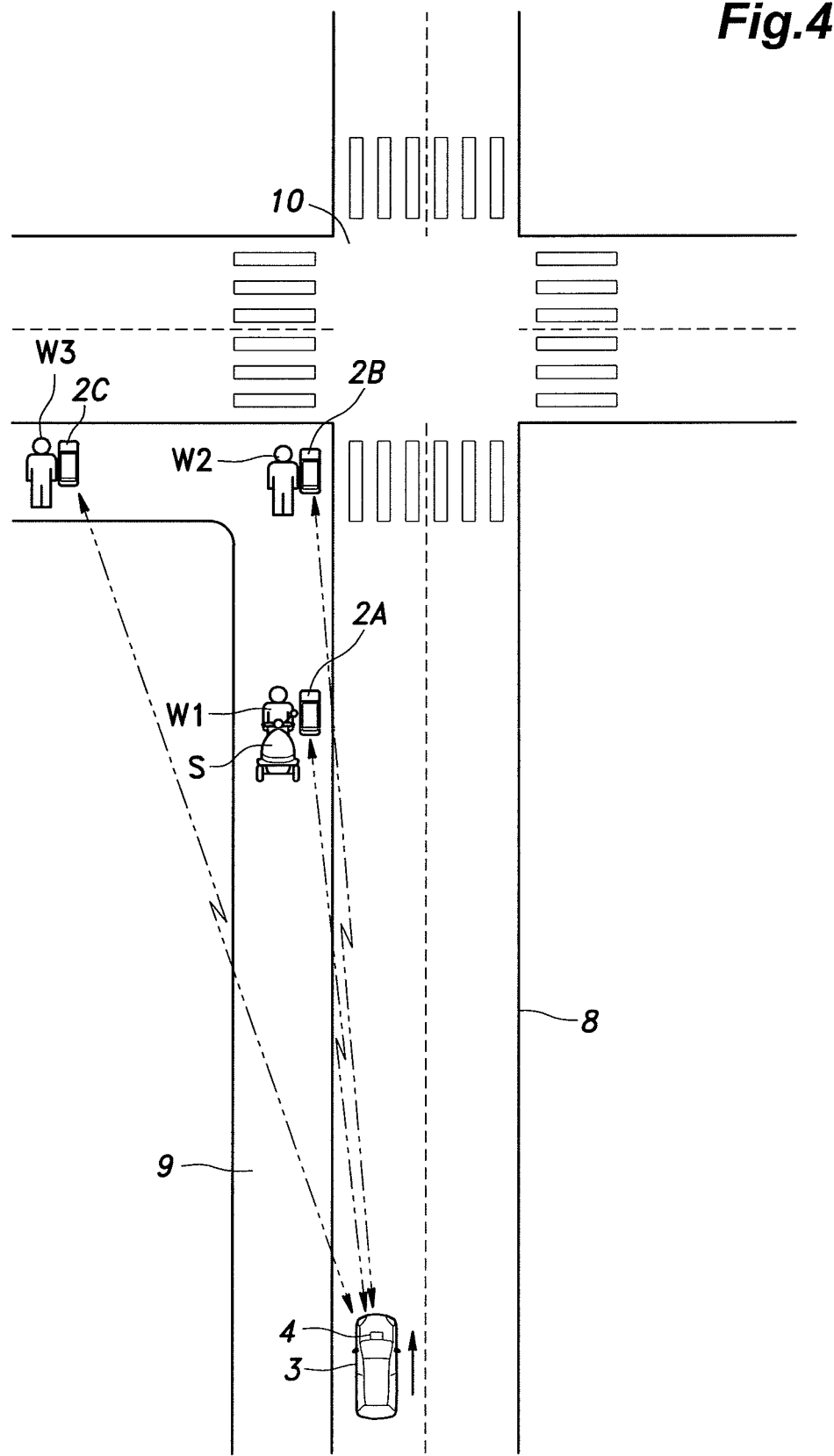
FIG. 4 is a diagram showing a positional relationship between a pedestrian and a vehicle traveling on a road.
Figure 5:
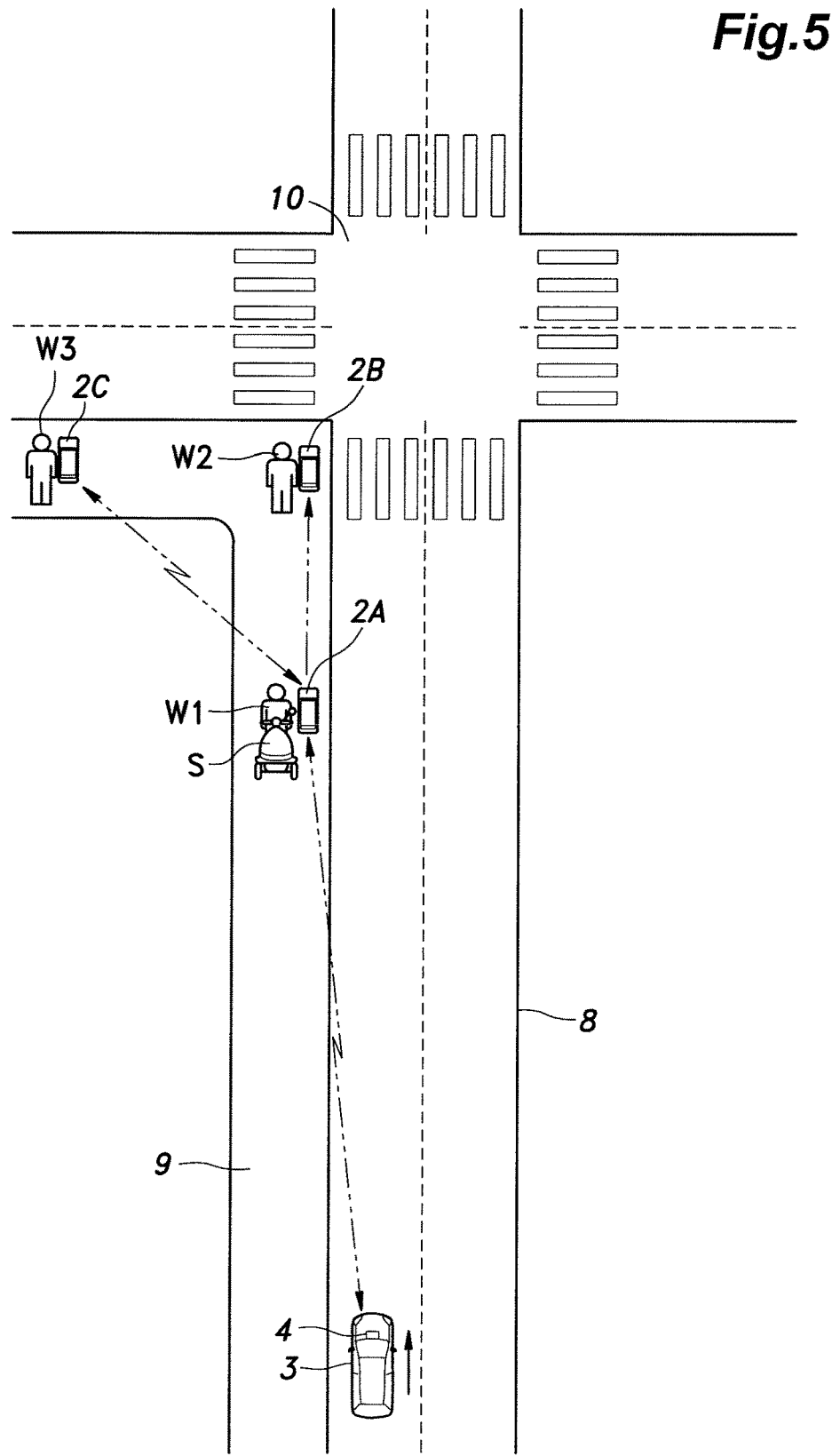
FIG. 5 is a diagram showing a positional relationship between a pedestrian and a vehicle traveling on a road.

FIGS. 4 and 5 show a vehicle 3 traveling on the road 8 and heading towards an intersection 10 and pedestrians W1, W2 and W3 on the sidewalk 9 extending along the road 8 (which may be simply referred to as pedestrians W in the following disclosure). The pedestrian W1 carries a pedestrian terminal device 2A, the pedestrian W2 carries a pedestrian terminal device 2B, and the pedestrian W3 carries a pedestrian terminal device 2C. The pedestrian terminal devices 2A, 2B and 2C are pedestrian terminal devices 2 according to the present invention. The pedestrian W1 is riding a senior car S, which is a walking assistance vehicle (electric vehicle). For the convenience of description, the number of pedestrians W is three in this case, but the number of pedestrians W is not limited to this.

FIG. 4 shows a state in which a pedestrian-vehicle communication is being performed between the in-vehicle terminal device 4 mounted on the vehicle 3 and the pedestrian terminal devices 2A to 2C carried by the pedestrians W1 to W3. FIG. 5 shows a state in which a short-range wireless communication is being performed between the pedestrian terminal device 2A carried by the pedestrian W1 and the pedestrian terminal devices 2B and 2C carried by the pedestrians W2 and W3. As described above, the short-range wireless communication is performed using a short-range wireless communication technology known in the art such as a wireless LAN (for example, Wi-Fi) and Bluetooth (registered trademark) which is lower power output wireless communication than the pedestrian-vehicle communication.

FIG. 6 is a sequence diagram showing the mode of signal exchange between the in-vehicle terminal device 4 and the pedestrian terminal devices 2A to 2C. The ordinate axis in FIG. 6 corresponds to the time axis. Also, T1 indicates a pedestrian-vehicle communication performed between the pedestrian-vehicle communicator 22 of each pedestrian terminal device 2A to 2C and the pedestrian-vehicle communicator 32 of the in-vehicle terminal device 4, and T2 indicates a short-distance wireless communication between the pedestrian terminal devices 2A to 2C. The signal transmission and reception are controlled, for example, by executed a program on the CPU, and various processes in the following description are performed by the controllers 25 (the other terminal information acquirers 25a, the operation mode selectors 25b and the communication stop processors 25c) of the pedestrian terminal devices 2A to 2C, and the controller 34 (the other terminal information acquirer 34a and the principal terminal determiner 34b) of the in-vehicle terminal device 4.

As shown in FIG. 4, when there are pedestrians W1, W2 and W3 on the sidewalk 9 near the intersection 10, and the in-vehicle terminal device 4 travels toward the intersection 11, as shown in FIG. 6, the in-vehicle terminal device 4 sequentially receives pedestrian information P(2A), P(2B) and P(2C) transmitted from the respective pedestrian terminal devices 2A to 2C. The pedestrian information P transmitted from each pedestrian terminal device 2 includes position information of the corresponding pedestrian terminal device 2. In addition, the pedestrian information P includes an ID (IP address, MAC address, etc.) of the corresponding pedestrian terminal device 2 so that the in-vehicle terminal device 4 can subsequently communicate with the pedestrian terminal device 2.

Further, the pedestrian information P includes attribute information of the pedestrian terminal device 2. The attribute information may include remaining battery charge information or battery charging information (being charged or not) of the battery of the pedestrian terminal device 2 such as the remaining battery charge or the remaining communication time, and use status information indicating if the user of the pedestrian terminal device 2 is walking, riding a senior car, or a personal mobility vehicle such as an electric bicycle. In this case, the pedestrian information P(2A) transmitted from the pedestrian terminal device 2A of the pedestrian W1 includes use status information indicating that the pedestrian W1 is riding a senior car S.

On the basis of the pedestrian information P received from the pedestrian terminal devices 2A to 2C, the in-vehicle terminal device 4 determines or designates one of the pedestrian terminal devices 2 as a "principal terminal" that operates in the principal terminal operation mode. The principal terminal is a terminal that performs a pedestrian-vehicle communication with the in-vehicle terminal device 4 on behalf of other pedestrian terminal devices 2. Since the pedestrian information P(2A) received from the pedestrian terminal device 2A includes use status information indicating that the pedestrian W1 carrying the pedestrian terminal device 2A is riding a senior car S, the pedestrian terminal device 2A is determined as the principal terminal based on the use status information. The pedestrian terminal device 2 carried by the pedestrian W riding the senior car S is determined as the principal terminal because, if the pedestrian is riding the senior car S, the battery of the pedestrian terminal device 2 can be recharged by electric power supplied by the senior car S even if the battery of the pedestrian terminal device A should run low.

Also, in order to prevent a traffic accident between a senior car and a pedestrian (traffic accidents between a senior car and a pedestrian are on the increase in recent years), it is needed to maintain communication between the senior car and the pedestrians. This is another reason why the pedestrian terminal device 2 carried by the pedestrian W riding the senior car S is determined as the principal terminal. Description has been made here of the case where the pedestrian terminal device 2 carried by a pedestrian riding a senior car is selected as a principal terminal, but a pedestrian terminal device 2 carried by a pedestrian riding a vehicle other than a senior car S (such as an electric bicycle and farm equipment) may also be selected as a principal terminal (traffic accidents of pedestrians involving bicycles and farm equipment are also on the increase in recent years).

The in-vehicle terminal device 4 may also determine the pedestrian terminal device 2 having the largest remaining battery charge or the pedestrian terminal device 2 having the longest remaining communication available time as the principal terminal according to the battery remaining charge information included in the pedestrian information P. The principal terminal determiner 34b of the in-vehicle terminal device 4 may determine the principal terminal based on other rules as will be discussed hereinafter.

When the pedestrian terminal device 2A is determined as the principal terminal by the in-vehicle terminal device 4, a principal terminal designation notification for notifying that the pedestrian terminal device 2A is designated as the principal terminal is transmitted from the in-vehicle terminal device 4 to the pedestrian terminal device 2A. The principal terminal designation notification may be transmitted together with the vehicle information C of the vehicle 3 or may be sent separately from the vehicle information C of the vehicle 3. By including the ID of the pedestrian terminal device 2A in the vehicle information C, transmission from the in-vehicle terminal device 4 to the pedestrian terminal device 2A becomes possible.

Upon receiving the principal terminal designation notification, the pedestrian terminal device 2A transitions to the principal terminal operation mode. Then, the pedestrian terminal device 2A (principal terminal) transmits to the other pedestrian terminal devices 2B and 2C a principal terminal communication status notification N1 notifying that the pedestrian terminal device 2A has transitioned to the principal terminal operation mode. The principal terminal communication status notification N1 includes an ID (IP address, MAC address, etc.) of the pedestrian terminal device 2A and position information thereof. The principal terminal communication status notification N1 is transmitted as a broadcast performed by the pedestrian-pedestrian communicator 23 of the pedestrian terminal device 2A by using a short-range wireless communication. The principal terminal communication status notification N1 is periodically transmitted at a predetermined time interval. Thereby, even when any other pedestrian terminal device in the surrounding area fails to receive the principal terminal communication status notification N1 or when any other pedestrian terminal device has moved far away from the principal terminal (which can be detected by computing the distance to the principal terminal on a regular basis), the pedestrian terminal device in the in-group terminal operation mode may be enabled to start a pedestrian-vehicle communication without any delay. This is advantageous also for allowing a newly approaching pedestrian terminal device to recognize the principal terminal in the area.

Upon receiving the principal terminal communication status notification N1 from the pedestrian terminal device 2A (principal terminal), the pedestrian terminal device 2B, based on the position information of the pedestrian terminal device 2A included in the principal terminal communication status notification N1, computes the distance between the pedestrian terminal devices 2B and 2A in question. When the computed distance is within a predetermined distance, the pedestrian terminal device 2B transmits a principal terminal communication request notification N2 requesting the pedestrian terminal device 2A to operate in the principal terminal operation mode. The principal terminal communication request notification N2 includes the ID and position information of the pedestrian terminal device 2B. Further, by including the ID of the pedestrian terminal device 2A in the principal terminal communication request notification N2, transmission from the pedestrian terminal device 2B to the pedestrian terminal device 2A becomes possible. When the computed distance exceeds the predetermined distance, it is judged that communication with the pedestrian terminal device 2A is impossible or difficult, and the principal terminal communication request notification N2 is not transmitted.

Upon receiving the principal terminal communication request notification N2 from the pedestrian terminal device 2B, the pedestrian terminal device 2A (principal terminal), based on the position information of the pedestrian terminal device 2B included in the principal terminal communication request notification N2, computes the distance between the two pedestrian terminal devices 2A and 2B. When the computed distance is within the predetermined distance, the principal terminal communication status notification N1 is given to the pedestrian terminal device 2B with the ID of the pedestrian terminal device 2B attached thereto, and is transmitted again. The principal terminal communication status notification N1 includes the ID and position information of the pedestrian terminal device 2A as in the previous case. The principal terminal communication status notification N1 may be transmitted together with the vehicle information C or may be sent separately from the vehicle information C. When the computed distance exceeds the predetermined distance, it is judged that communication with the pedestrian terminal device 2B is impossible or difficult, and the ID of the pedestrian terminal device 2B is not attached to the principal terminal communication status notification N1. In this manner, the principal terminal communication status notification N1 is transmitted again in order to notify that the pedestrian terminal device 2A (principal terminal) has received the principal terminal communication request notification N2 from the pedestrian terminal device 2B.

When the pedestrian terminal device 2B has received the principal terminal communication status notification N1 attached with the ID of the pedestrian terminal device 2B, the pedestrian terminal device 2B transitions to the in-group terminal operation mode, and stops the pedestrian-vehicle communication with the pedestrian-vehicle communicator 22. Thereafter, the pedestrian terminal device 2B communicates with the pedestrian terminal device 2A (principal terminal) via the short-range wireless communication with the pedestrian-pedestrian communicator 23. On the time axis of T1 in FIG. 6, a state where the pedestrian-vehicle communication is being transmitted is indicated by a solid line, and a state where it is stopped is indicated by a broken line.

As in the case of the pedestrian terminal device 2B, upon receiving the principal terminal communication status notification N1 from the pedestrian terminal device 2A (principal terminal), the pedestrian terminal device 2C computes the distance between the two pedestrian terminal devices 2A and 2C based on the position information of the pedestrian terminal device 2A, and when the computed distance is within the predetermined distance, transmits the principal terminal communication request notification N2 to the pedestrian terminal device 2A. When the computed distance exceeds the predetermined distance, it is judged that communication with the pedestrian terminal device 2A is impossible or difficult, and the principal terminal communication request notification N2 is not transmitted.

Upon receiving the principal terminal communication request notification N2 from the pedestrian terminal device 2C, the pedestrian terminal device 2A (principal terminal), based on the position information of the pedestrian terminal device 2C included in the principal terminal communication request notification N2, computes the distance between the two pedestrian terminal devices 2A and 2C. When the computed distance is within the predetermined distance, the principal terminal communication status notification N1 is given to the pedestrian terminal device 2C with the ID of the pedestrian terminal device 2C attached thereto, and is transmitted again. When the computed distance exceeds the predetermined distance, it is judged that communication with the pedestrian terminal device 2C is impossible or difficult, and the ID of the pedestrian terminal device 2C is not attached to the principal terminal communication status notification N1.

Upon receiving the principal terminal communication status notification N1 attached with the ID of the pedestrian terminal device 2C, the pedestrian terminal device 2C transitions to the in-group terminal operation mode, and stops the pedestrian-vehicle communication with the pedestrian-vehicle communicator 22. Thereafter, the pedestrian terminal device 2C communicates with the pedestrian terminal device 2A (principal terminal) via a short-range wireless communication with the pedestrian-pedestrian communicator 23.

In the example shown in FIG. 6, the transmission and reception of the principal terminal communication status notification N1 and the principal terminal communication request notification N2 were performed as broadcasts via the short-range wireless communication between the pedestrian terminal device 2A and the pedestrian terminal devices 2B and 2C. It should be noted that the transmission and reception of the principal terminal communication status notification N1 and the principal terminal communication request notification N2 performed between the pedestrian terminal device 2A and the pedestrian terminal devices 2B and 2C may also be carried out via the pedestrian-vehicle communication by using the pedestrian-vehicle communicator 22, instead of the short-range wireless communication using the pedestrian-pedestrian communicator 23. However, as discussed above, since the short-range wireless communication using the pedestrian-pedestrian communicator 23 consumes less power than the pedestrian-vehicle communication using the pedestrian-vehicle communicator 22, it is preferable to use the short-range wireless communication using the pedestrian-pedestrian communicator 23.

Thereafter, the pedestrian terminal device 2A (principal terminal) performs a pedestrian-vehicle communication with the in-vehicle terminal device 4 (see FIG. 5), transmits pedestrian information P(2A) of the pedestrian terminal device 2A to the in-vehicle terminal device 4, and receives the vehicle information C of the vehicle 3 from the in-vehicle terminal device 4. Then, the pedestrian terminal device 2A simultaneously transmits the vehicle information C received from the in-vehicle terminal device 4 to the pedestrian terminal devices 2B and 2C via the short-range wireless communication with the pedestrian-pedestrian communicator 23. The above-described pedestrian-vehicle communication and short-range wireless communication may be performed periodically at a prescribed time interval or may be performed according to the distance between the terminal devices.

In the case where the communications are performed according to the distance between terminals, the time interval may be lengthened when the distance between the pedestrian terminal device 2A and the in-vehicle terminal device 4 is great, and the time interval may be progressively decreased as the distance decreases, for example. The time interval may be 2 seconds when the distance is 100 m or more, 1.5 seconds when the distance is 100 m to 50 m, and 1 second when the distance is 50 m or less, for instance. It is also possible to arrange such that, when the distance between the pedestrian terminal device 2A and the intersection 10 is great, the time interval may be increased, and the time interval may be progressively decreased as the distance between the pedestrian terminal device 2A and the intersection 10 decreases. Further, the time interval may be changed according to the distance between the pedestrian terminal device 2B (2C) and the in-vehicle terminal device 4, and the distance between the pedestrian terminal device 2B (2C) and the intersection 10. Further, the relationship between the distance between terminals and the time interval may be changed according to the relative speed between the pedestrian terminal device and the in-vehicle terminal device. For example, when the distance between the pedestrian terminal device and the in-vehicle terminal device is 100 to 50 m, the time interval may be 1.5 seconds if the relative speed between the pedestrian terminal device and the in-vehicle terminal device is 50 km/s, and 1 second if the relative speed between the pedestrian terminal device and the in-vehicle terminal device is 100 km/s, for instance.

In this way, the pedestrian terminal devices 2B and 2C can each receive the vehicle information C of the vehicle 3 from the pedestrian terminal device 2A (principal terminal) via the short-range wireless communication by using the pedestrian-pedestrian communicator 23. Since the short-range wireless communication with the pedestrian-pedestrian communicator 23 consumes less power than the pedestrian-vehicle communication with the pedestrian-vehicle communicator 32, it is possible to save power consumption of the pedestrian terminal devices 2B and 2C. In the first embodiment, the pedestrian terminal device 2A (principal terminal) transmits the vehicle information C simultaneously to those pedestrian terminal devices 2B and 2C which have transitioned to the in-group terminal operation mode. In this manner, since the pedestrian terminal device 2A (principal terminal) communicates with the pedestrian terminal devices 2B and 2C which are in the in-group terminal operation mode in a one-to-many relationship, it is possible to efficiently transmit and receive signals between the device 2A (principal terminal) and the other pedestrian terminal devices 2B and 2C. Furthermore, it is possible to reduce the burden on the power of the pedestrian terminal device 2A (principal terminal).

Moreover, since the vehicle operator of the vehicle 3 can receive the pedestrian information P (position information) of the pedestrian W1 from the pedestrian terminal device 2A, the vehicle operator of the vehicle 3 can operate the vehicle in a safe way according to the pedestrian information P (position information) of the pedestrian W1 even when the pedestrian information P (position information) of the pedestrians W2 and W3 is not available owing to the absence of the pedestrian-vehicle communication T1 with the pedestrian terminal devices 2B and 2C.

Second Embodiment

A second embodiment of the pedestrian-vehicle communication system of the present invention is described in the following with reference to FIG. 7. In the first embodiment described above, the pedestrian terminal device 2A, which is the principal terminal, communicates with the pedestrian terminal devices 2B and 2C which are in the in-group terminal operation mode in a one-to-many relationship. The second embodiment differs from the first embodiment in that the pedestrian terminal device 2A, which is the principal terminal, communicates with the pedestrian terminal devices 2B and 2C which are in the in-group terminal operation mode in a one-to-one relationship. Since the second embodiment is otherwise similar to the first embodiment, detailed description of other parts of the second embodiment are omitted in the following disclosure. In the following is described the transmission and reception of signals after the pedestrian terminal device 2A has once again transmitted the principal terminal communication status notification N1 to the pedestrian terminal devices 2B and 2C.

After transmitting the principal terminal communication status notification N1 again to the pedestrian terminal device 2B, the pedestrian terminal device 2A (principal terminal) performs a pedestrian-vehicle communication with the in-vehicle terminal device 4 to transmit the pedestrian information P(2A) of the pedestrian terminal device 2A to the in-vehicle terminal device 4 and to receive the vehicle information C of the vehicle 3 from the in-vehicle terminal device 4. Then, the pedestrian terminal device 2A transmits the vehicle information C received from the in-vehicle terminal device 4 to the pedestrian terminal device 2B.

Similarly as in the case of the pedestrian terminal device 2B, after the pedestrian terminal device 2A (principal terminal) has transmitted the principal terminal communication status notification N1 again to the pedestrian terminal device 2C, the pedestrian terminal device 2A (principal terminal) performs the pedestrian-vehicle communication with the in-vehicle terminal device 4 to transmit the pedestrian information P(2A) of the pedestrian terminal device 2A to the in-vehicle terminal device 4, and to receive the vehicle information C of the vehicle 3 from the in-vehicle terminal device 4. Then, the pedestrian terminal device 2A transmits the vehicle information C received from the in-vehicle terminal device 4 to the pedestrian terminal device 2C.

In this way, in the second embodiment, the pedestrian terminal device 2A communicates with the pedestrian terminal devices 2B and 2C which are in the in-group terminal mode in a one-to-one relationship. This allows the exchanges of signals between the pedestrian terminal device 2A and the pedestrian terminal devices 2B and 2C in a highly reliable manner.

Third Embodiment

A third embodiment of the pedestrian-vehicle communication system of the present invention is described in the following with reference to FIG. 8. In the first embodiment described above, the pedestrian terminal device 2A, which is the principal terminal, transmits only the pedestrian information P(2A) of the pedestrian terminal device 2A to the in-vehicle terminal device 4. The third embodiment differs from the first embodiment in that the pedestrian terminal device 2A notifies the in-vehicle terminal device 4 of not only the pedestrian information P(2A) of the pedestrian terminal device 2A but also the pedestrian information P(2B) and P(2C) of the other pedestrian terminal devices 2B and 2C. Since the third embodiment is otherwise similar to the first embodiment, detailed description of other parts of the third embodiment are omitted in the following disclosure. In the following is described the transmission and reception of signals after the pedestrian terminal device 2A has once again transmitted the principal terminal communication status notification N1 to the pedestrian terminal devices 2B and 2C.

Upon receiving the principal terminal communication status notification N1 from the pedestrian terminal device 2A (principal terminal) once again, the pedestrian terminal device 2B transmits the pedestrian information P(2B) to pedestrian terminal device 2A.

Similarly as in the case of the pedestrian terminal device 2B, upon receiving the principal terminal communication status notification N1 from the pedestrian terminal device 2A (principal terminal) once again, the pedestrian terminal device 2C transmits the pedestrian information P(2C) including the position information of the pedestrian P(2C) to the pedestrian terminal device 2A.

Upon receiving the pedestrian information P(2B) and the pedestrian information P(2C) from the pedestrian terminal devices 2B and 2C, the pedestrian terminal device 2A (principal terminal) performs a pedestrian-vehicle communication with the in-vehicle terminal device 4 to transmit the pedestrian information P(2A, 2B, 2C) of the pedestrian terminal devices 2A, 2B and 2C to the in-vehicle terminal device 4, and receive the vehicle information C of the vehicle 3 from the in-vehicle terminal device 4. Then, the pedestrian terminal device 2A transmits the vehicle information C received from the in-vehicle terminal device 4 simultaneously to the pedestrian terminal devices 2B and 2C by the short-range wireless communication using the pedestrian-pedestrian communicator 23.

In this manner, in the third embodiment, the pedestrian terminal device 2A, which is a principal terminal, transmits the pedestrian information P(2B) and P(2C) received from the pedestrian terminal devices 2B and 2C to the in-vehicle terminal device 4. As a result, the in-vehicle terminal device 4 can receive not only the pedestrian information P of the pedestrian terminal device 2A but also the pedestrian information P of the pedestrian terminal devices 2B and 2C so that more detailed information about the pedestrians W2 and W3 can be received. FIG. 9 shows an example of pedestrian information that is transmitted by the principal terminal to the in-vehicle terminal device.

Figure 10A:
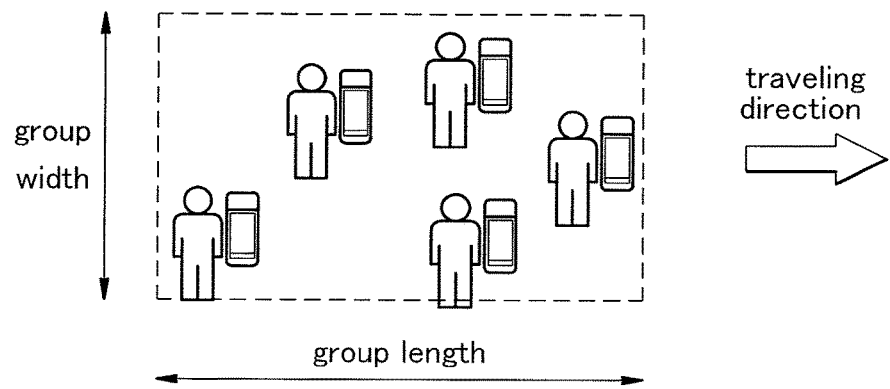
FIG. 10a is diagram illustrating a positional relationship between the principal terminal and in-group terminals when all of the terminals are located within a rectangular area.
Figure 10B:
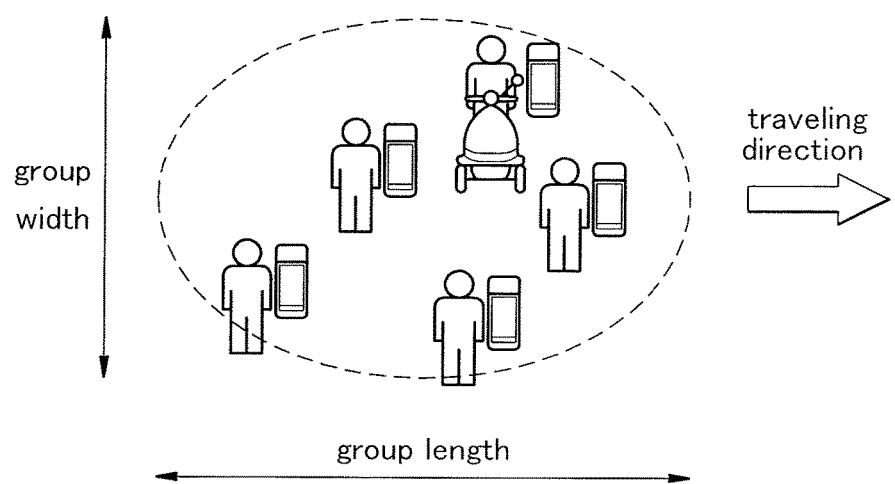
FIG. 10b is diagram illustrating a positional relationship between the principal terminal and in-group terminals when all of the terminals are located within an elliptic or circular area.

Also, instead of transmitting the pedestrian information P of all the in-group terminals to the in-vehicle terminal device 4, the principal terminal may collectively transmit this information as group information. This will be explained with reference to FIGS. 10 and 11. FIGS. 10a and 10b are diagrams showing the positional relationship between the principal terminal and the other terminals forming a group, FIG. 10a showing a case where all of the terminals are located in a rectangular area, and FIG. 10b showing a case where all of the terminals are located in a circular or elliptic area. Information on the area in which the principal terminal and the in-group terminals are located may be transmitted from the principal terminal to the in-vehicle terminal device as group information. The group information may consist of information that can specify the area where all of the terminal devices are located, and, for example, may composed of position information (latitude, longitude and altitude) of the center and end points of the area and the configuration (shape, length and width) of the area. FIG. 11 shows an example of the contents of the pedestrian information that the principal terminal transmits to the in-vehicle terminal device in such a case.

Fourth Embodiment

Figure 12:
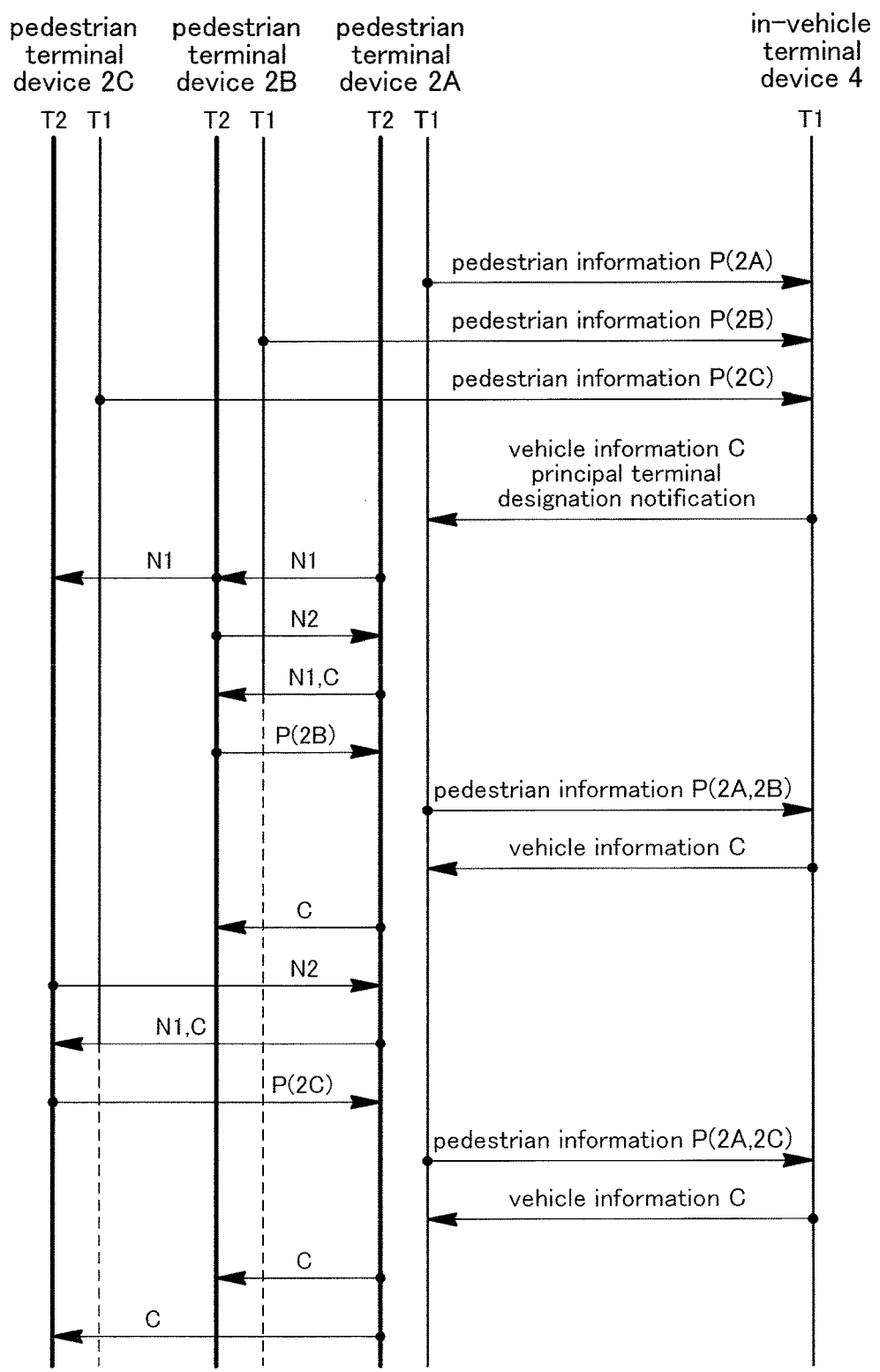
FIG. 12 is a similar control sequence diagram according to a fourth embodiment of the present invention.

A fourth embodiment of the pedestrian-vehicle communication system of the present invention is described in the following with reference to FIG. 12. The third embodiment differs from the fourth embodiment in that the pedestrian terminal device 2A, which is the principal terminal, communicates with the pedestrian terminal devices 2B and 2C operating in the in-group terminal mode in a one-to-many relationship. Since the fourth embodiment is otherwise similar to the third embodiment, detailed description of other parts of the fourth embodiment are omitted in the following disclosure. In the following is described the transmission and reception of signals after the pedestrian terminal device 2A has once again transmitted the principal terminal communication status notification N1 to the pedestrian terminal devices 2B and 2C.

Upon receiving the principal terminal communication status notification N1 from the pedestrian terminal device 2A (principal terminal) once again, the pedestrian terminal device 2B transmits pedestrian information P(2B) containing the position information of the pedestrian terminal device 2B to the pedestrian terminal device 2A.

Upon receiving the pedestrian information P(2B) from the pedestrian terminal device 2B, the pedestrian terminal device 2A performs a pedestrian-vehicle communication with the in-vehicle terminal device 4 to transmit the pedestrian information P(2A, 2B) of the pedestrian terminal devices 2A and 2B, and receive the vehicle information C of the vehicle 3 from the in-vehicle terminal device 4. The pedestrian terminal device 2A then transmits the vehicle information C received from the in-vehicle terminal device 4 to the pedestrian terminal device 2B.

Similarly to the case of the pedestrian terminal device 2B, upon receiving the principal terminal communication status notification N1 from the pedestrian terminal device 2A (principal terminal) once again, the pedestrian terminal device 2C transmits the pedestrian information P(2C) including the position information of the pedestrian terminal device 2C to the pedestrian terminal device 2A.

Upon receiving the pedestrian information P(2C) from the pedestrian terminal device 2C, the pedestrian terminal device 2A performs a pedestrian-vehicle communication with the in-vehicle terminal device 4 to transmit the pedestrian information P(2A, 2C) of the pedestrian terminal devices 2A and 2C to the in-vehicle terminal device 4, and receive the vehicle information C of the vehicle 3 from the in-vehicle terminal device 4. The pedestrian terminal device 2A then transmits the vehicle information C received from the in-vehicle terminal device 4 to the pedestrian terminal device 2C.

In this manner, in the fourth embodiment, the pedestrian terminal device 2A communicates with the pedestrian terminal devices 2B and 2C that are operating in the in-group terminal mode in a one-to-one relationship. This allows the exchange of signals between the pedestrian terminal device 2A and the pedestrian terminal devices 2B and 2C to be performed in a highly reliable manner.

In the first to fourth embodiments described above, the pedestrian terminal device 2A that has transitioned to the principal terminal operation mode transmits the principal terminal communication status notification N1 to the pedestrian terminal devices 2B and 2C so that a process of transmitting and receiving signals may be initiated between the pedestrian terminal device 2A and the pedestrian terminal devices 2B and 2C. It is also possible to have this process to be initiated when the pedestrian terminal devices 2B and 2C operating in the in-group terminal mode have transmitted a principal terminal communication request notification N2 to the pedestrian terminal device 2A. Further, besides the first to fourth embodiments, it is also possible to combine a communication of one-to-one relation with a communication of one-to-many relation. The mode of communication can be thus changed depending on to whom the information is to be transmitted and the required level of reliability in communication, for instance, by using the one-to-many relation when transmitting the information along with the vehicle information C to all of the in-group terminal devices, and using the one-to-one relationship in other cases.

In the first to fourth embodiments described above, the principal terminal was determined based on the use status information of the pedestrian terminal device 2, but the determination of the principal terminal 2 may be performed in other ways. For example, the position information of each pedestrian terminal device 2 included in the pedestrian information P may be referred to so that the pedestrian terminal device 2 closest to the vehicle 3 may be determined as the principal terminal. Alternatively, the pedestrian information P may include the battery information of the pedestrian terminal devices 2, and the pedestrian terminal device with the battery having the greatest remaining battery charge level may be determined as the principal terminal. Alternatively, the pedestrian information P may include hazardous action histories of the pedestrians W, and the pedestrian terminal device with the most hazardous history may be determined as the principal terminal. Alternatively, by referring to the signal reception levels of the pedestrian information P, one having the best radio wave reception level may be determined as the principal terminal. Furthermore, a plurality of principal terminals may be designated, and the principal terminal may be switched among them at a prescribed regular interval. Also, a new principal terminal may be determined at a prescribed regular interval. The pedestrian terminal device determined to be at the head of a group of pedestrian terminal devices may be determined as the principal terminal based on the information on the position and the moving direction of the pedestrian terminal devices. In the case of a group of children going to school or leaving school, the leader of the group typically walks at the head of the group. Therefore, it may be appropriate to select the pedestrian walking at the head of the group as the principal terminal.

In the first to fourth embodiments described above, the principal terminal 2 is determined by the principal terminal determiner 34b of the in-vehicle terminal device 4, but the principal terminal 2 may also be determined by the operation mode selector 25b of the pedestrian terminal device 2. For example, it may be arranged such that the pedestrian terminal device 2 communicates with other pedestrian terminal devices 2 to acquire the pedestrian information P including the position information of the pedestrian terminal devices 2, and based on the acquired position information, determines the pedestrian terminal device 2 closest to the vehicle 3 as the principal terminal. Alternatively, the pedestrian information P may include such other information as the battery charge information of the pedestrian terminal devices 2, the hazardous action histories, and the use status information (for example, information indicating that the user is riding a senior car), and the principal terminal 2 may be determined based on such information. Alternatively, information, instructions, or the like may be acquired from fixed terminals arranged along the road so that the principal terminal 2 may be determined based on the acquired information, instruction, or the like.

Fifth Embodiment

Figure 13:
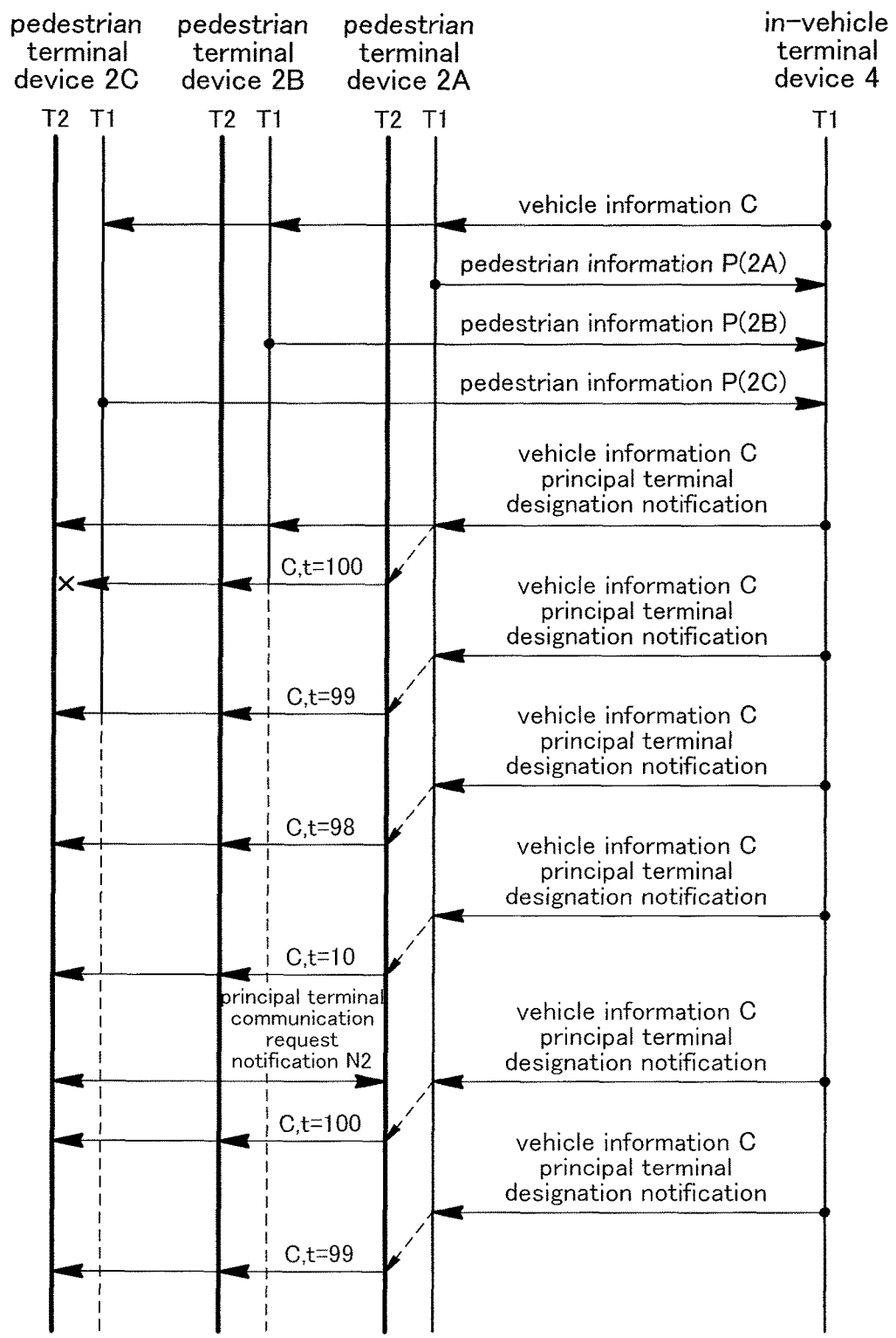
FIG. 13 is a similar control sequence diagram according to a fifth embodiment of the present invention.

In the first to fourth embodiments described above, the pedestrian terminal device 2A that has transitioned to the principal terminal operation mode executed a process, such as explicitly attaching the ID, for allow the pedestrian terminal device 2B, 2C that has transmitted the principal terminal communication request notification N2 to know that the pedestrian terminal device 2A has received the principal terminal communication request notification N2. FIG. 13 shows an embodiment in which the pedestrian terminal device 2A that has transitioned to the principal terminal operation mode does not explicitly indicate that the principal terminal communication request notification N2 has been received.

In the embodiment shown in FIG. 13, the in-vehicle terminal device 4 determines the pedestrian terminal device 2A as the principal terminal, and transmits the principal terminal designation notification, but the principal terminal may be determined by any of the methods discussed above. Upon receiving the principal terminal designation notification, the pedestrian terminal device 2A transitions to the principal terminal operation mode, and transmits the vehicle information C via a broadcast communication using the short-range wireless communication. The principal terminal operation mode continues for a predetermined time duration. Time information t is attached to the broadcast signal containing the vehicle information C so that the time duration can be determined from the other pedestrian terminal devices. In FIG. 13, the time information t=100 indicating that the predetermined time duration is 100 seconds is transmitted. The time information counts down as time elapses. When the time information has become 0, the principal terminal operation mode ends. The unit of time information is 1 second in this case, but may also be 5 seconds or 10 seconds. In addition, the transmission output information and the position information of the pedestrian terminal device 2A may be added to the broadcast signal.

Meanwhile, upon receiving the broadcast signal carrying the vehicle information C from the pedestrian terminal device 2A, the pedestrian terminal device 2B computes the distance to the pedestrian terminal device 2A according to the signal strength of the broadcast signal and/or the position information of the pedestrian terminal device 2A, and determines if the computed distance is equal to or less than a predetermined distance. When it is determined that the computed distance is equal to or less than the predetermined distance, the operation mode is switched to the in-group terminal operation mode. Further, a condition such that the pedestrian terminal device 2A is located ahead of the own pedestrian terminal device may be attached.

Similarly, the pedestrian terminal device 2C determines whether to transition to (remain in) the in-group terminal operation mode. The pedestrian terminal device 2B (2C) monitors the time information t of the broadcast signal from the pedestrian terminal device 2A, and transmits the principal terminal communication request notification N2 as a broadcast when the time information t falls below a predetermined value. In FIG. 13, at the time point where time information t=10, the principal terminal communication request notification N2 is transmitted. Upon receiving the principal terminal communication request notification N2, the pedestrian terminal device 2A returns the time information t to the initial value, and continues the principal terminal operation mode.

As described above, the pedestrian terminal device 2A does not need to recognize all of the pedestrian terminal devices forming the group, and can easily form a group, leave a group, and cancel a group.

The process flow of the principal terminal operation mode of the pedestrian terminal device 2A and the process flow of the in-group terminal operation mode of the pedestrian terminal devices 2B and 2C are described in the following with reference to FIGS. 14 and 15. The following process flows are executed by the controllers 25 (the other terminal information acquirers 25a, the operation mode selectors 25b, the communication stop processors 25c) of the pedestrian terminal devices 2A to 2C operating under prescribed computer programs.

Figure 14:
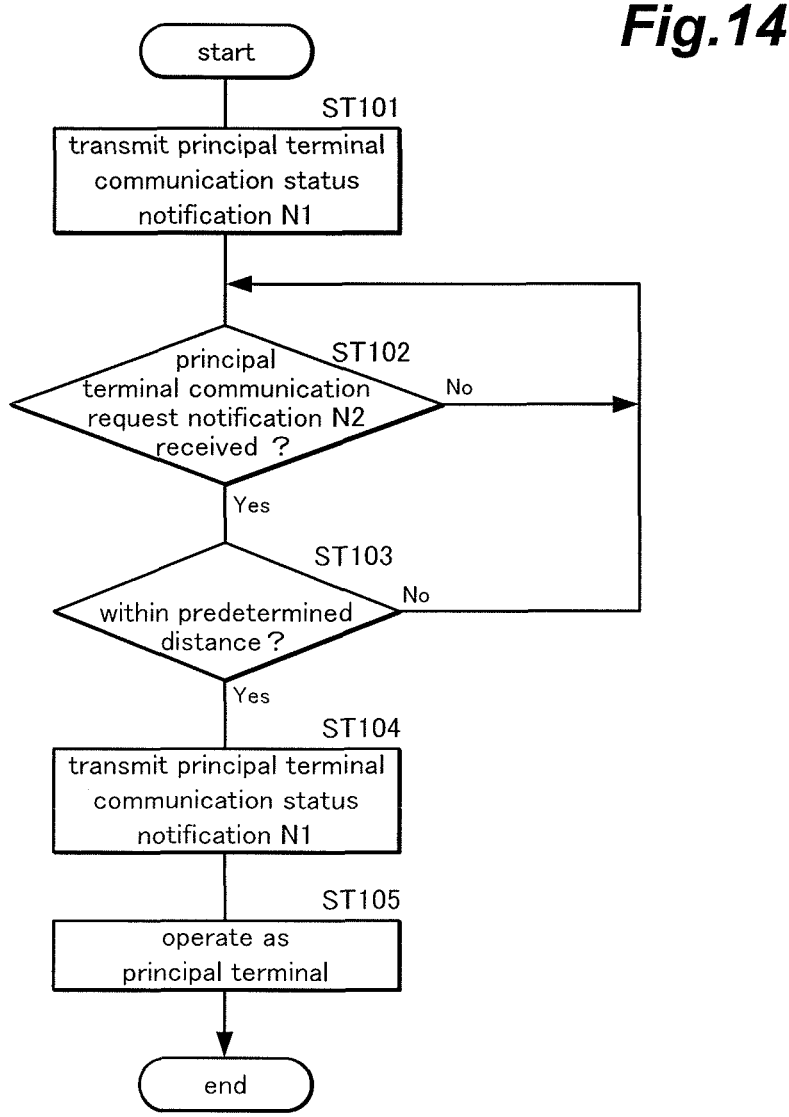
FIG. 14 is a flowchart showing a process flow of a principal terminal operation mode of the pedestrian terminal device.

FIG. 14 is a flowchart showing the process flow of the principal terminal operation mode of the pedestrian terminal device 2A. Referring to FIG. 14, first of all, the pedestrian terminal device 2A, which is operating in the principal terminal operation mode, broadcasts a principal terminal communication status notification N1 to the other pedestrian terminal devices 2B and 2C (ST101). This broadcast transmission is performed by the short-range wireless communication using the pedestrian-pedestrian communicator 23. The principal terminal communication status notification N1 includes an ID (IP address, MAC address, etc.) and the position information of the pedestrian terminal device 2A.

Next, the pedestrian terminal device 2A determines if the principal terminal communication request notification N2 has been received from the pedestrian terminal device 2B (or 2C) (ST102). If it is determined that the principal terminal communication request notification N2 has been received, the process flow proceeds to step ST103, and if it is determined that the principal terminal communication request notification N2 has not been received, the process returns to step ST102. In the principal terminal communication request notification N2, the ID (IP address, MAC address, etc.) and the position information of the pedestrian terminal device 2B (2C) are included.

In step ST103, the pedestrian terminal device 2A computes the distance to the pedestrian terminal device 2B (2C) according to the position information of the pedestrian terminal device 2B (2C) included in the principal terminal communication request notification N2, and determines if the computed distance is equal to or less than a predetermined distance. When it is determined that the computed distance is equal to or less than the predetermined distance, the process proceeds to step ST104. When it is determined that the computed distance exceeds the predetermined distance, the process flow returns to step ST102. This determination step may be carried out based on not only the distance to the pedestrian terminal device 2B (2C) but also the signal level of the short-range communication with the pedestrian terminal device 2B (2C). In other words, even when the distance is equal to or less than the predetermined distance, if the signal level is equal to or higher than the predetermined level, the process proceeds to step ST104, and if it is determined that the signal level is less than or equal to the predetermined level, the process returns to step ST102. By using the signal level for the determination, the quality of information exchange in the short-range wireless communication between the principal terminal and the in-group terminals can be improved, and the loss of information can be minimized.

In step ST104, the pedestrian terminal device 2A transmits the principal terminal communication status notification N1 attached with the ID of the pedestrian terminal device 2B (2C) to the pedestrian terminal device 2B (2C) that has transmitted the principal terminal communication request notification N2 once again. The principal terminal communication status notification N1 may be transmitted by broadcasting or may be transmitted via a one-to-one communication. Since the ID of the pedestrian terminal device 2B (2C) is included in the principal terminal communication request notification N2 received from the pedestrian terminal device 2B (2C), the pedestrian terminal device 2A is able to transmit the principal terminal communication request notification N2 to the pedestrian terminal device 2B (2C) that has transmitted the principal terminal communication status notification N1. In this manner, the principal terminal communication status notification N1 is transmitted again in order to notify that the pedestrian terminal device 2A has received the principal terminal communication request notification N2 from the pedestrian terminal device 2B (2C).

In step ST105, the pedestrian terminal device 2A starts the operation as a principal terminal that performs a pedestrian-vehicle communication with the in-vehicle terminal device 4 as a representative of the pedestrian terminal devices 2A to 2C. The principal terminal operation mode of the pedestrian terminal device 2A can be terminated according to a desire of the user. Alternatively, the pedestrian terminal device 2B (2C) may periodically transmit the principal terminal communication request notification N2 to the pedestrian terminal device 2A, and the principal terminal operation mode may be terminated when the pedestrian terminal device 2A fails to receive the principal terminal communication request notification N2 from the pedestrian terminal device 2B (2C) for a prescribed time period.

Figure 15:
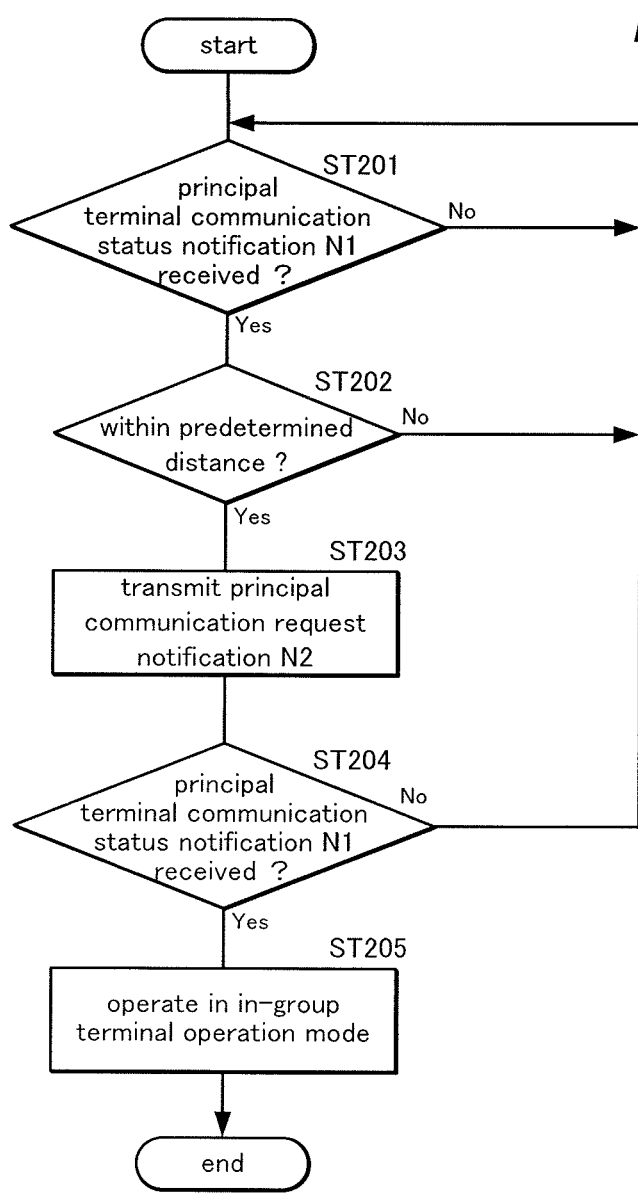
FIG. 15 is a flowchart showing a process flow of an in-group terminal operation mode of the pedestrian terminal device.

FIG. 15 is a flowchart showing the process flow of the in-group terminal operation mode of the pedestrian terminal devices 2B and 2C. Referring to FIG. 15, first of all, the pedestrian terminal device 2B (or 2C) that has selected the in-group terminal operation mode determines if a principal terminal communication status notification N1 has been received from the pedestrian terminal device 2A (ST201). When it is determined that the principal terminal communication status notification N1 has been received, the process flow proceeds to step ST202. If it is determined that the principal terminal communication status notification N1 has not been received, the process flow returns to step ST201. The principal terminal communication status notification N1 includes an ID (IP address, MAC address, etc.) and the position information of the pedestrian terminal device 2A.

In step ST202, the pedestrian terminal device 2B (2C) computes the distance to the pedestrian terminal device 2A according to the position information of the pedestrian terminal device 2A included in the principal terminal communication status notification N1, and determines if the computed distance is equal to or less than a predetermined distance. If it is determined that the computed distance is equal to or less than the predetermined distance, the process proceeds to step ST203. If it is determined that the distance exceeds the predetermined distance, the process returns to step ST201. This determination step may be carried out based on not only the distance to the pedestrian terminal device 2A but also the signal level of the short-range communication with the pedestrian terminal device 2A. In other words, even when the distance is equal to or less than the predetermined distance, if the signal level is equal to or higher than the predetermined level, the process proceeds to step ST203, and if it is determined that the signal level is less than or equal to the predetermined level, the process flow returns to step ST201. By using the signal level for the determination, the quality of information exchange in the short-range wireless communication between the principal terminal and the in-group terminals can be improved, and the loss of information can be minimized.

In step ST203, the pedestrian terminal device 2B (2C) transmits the principal terminal communication request notification N2 to the pedestrian terminal device 2A that has transmitted the principal terminal communication status notification N1. Since the ID (IP address, MAC address, etc.) of the pedestrian terminal device 2A is included in the principal terminal communication status notification N1 received from the pedestrian terminal device 2A, the pedestrian terminal device 2B (2C) is able to transmit the principal terminal communication request notification N2 to the pedestrian terminal device 2A. There may be a case where there are a plurality of pedestrian terminal devices 2 operating in the principal terminal operation mode. Even in such a case, the pedestrian terminal device 2B (2C) is able to distinguish the pedestrian terminal device 2A that has transmitted the principal terminal communication status notification N1 to the pedestrian terminal device 2B (2C) according to the ID included in the principal terminal communication status notification N1.

In the following step ST204, the pedestrian terminal device 2B (2C) determines if the principal terminal communication status notification N1 attached with the ID of the pedestrian terminal device 2B (2C) has been received from the pedestrian terminal device 2A. When it is determined that the principal terminal communication status notification N1 attached with the ID of the own terminal is received, the process flow proceeds to step ST205. If it is determined that the principal terminal communication status notification N1 has not been received, the process returns to step ST201. In this way, by receiving the principal terminal communication status notification N1 attached with the ID of the pedestrian terminal device 2B (2C) that has transmitted the principal terminal communication request notification N2 from the pedestrian terminal device 2A after the principal terminal communication request notification N2 is transmitted, it can be determined that the pedestrian terminal device 2A has received the principal terminal communication request notification N2 from the pedestrian terminal device 2B (2C).

Then, in step ST205, the pedestrian terminal device 2B (2C) starts operating as an in-group terminal operation mode, and stops the pedestrian-vehicle communication using the pedestrian-vehicle communicator 22. Thereafter, the pedestrian terminal device 2B (2C) communicates with the pedestrian terminal device 2A via the short-range wireless communication by using the pedestrian-pedestrian communicator 23. The in-group terminal operation moue of the pedestrian terminal device 2B (2C) can be terminated according to the desires of the users. Alternatively, the pedestrian terminal device 2A may periodically transmit the principal terminal communication status notification N1 to the pedestrian terminal device 2B (2C), and the in-group terminal operation mode may be terminated when the pedestrian terminal device 2B (2C) fails to receive a principal terminal communication status notification N1 from the pedestrian terminal device 2A for a predetermined time period. The pedestrian terminal device 2A may periodically transmit the position information of the pedestrian terminal device 2A to the pedestrian terminal device 2B (2C), and the in-group terminal operation mode may be terminated when the distance between the pedestrian terminal device 2A and the pedestrian terminal device 2B (2C) has become greater than a predetermined value.

Although the present invention has been described in terms of preferred embodiments thereof, it is obvious to a person skilled in the art that various alterations and modifications are possible without departing from the scope of the present invention. It should be noted that the constituent elements of the pedestrian terminal device, the pedestrian-vehicle communication system including the pedestrian terminal device, and the pedestrian-vehicle communication method according to the present invention are not necessarily entirely essential, but may be partly omitted and substituted without departing from the spirit of the present invention.

INDUSTRIAL APPLICABILITY

The pedestrian terminal device, the pedestrian-vehicle communication system including the pedestrian terminal device, and the pedestrian-vehicle communication method according to the present invention are applicable as a device, a system and a method that can minimize power consumption.

GLOSSARY OF TERMS 1 pedestrian
2 pedestrian terminal device
3 vehicle
4 in-vehicle terminal device
5 portable information terminal 6 car navigation system
21 location information acquirer
22 pedestrian-vehicle communicator
23 pedestrian-pedestrian communicator
24 portable terminal processor
25 controller
25a other terminal information acquirer
25b operation mode selector
25c communication stop processor
31 location information acquirer
32 pedestrian-vehicle communicator
33 car navigation processor
34 controller
34a other terminal information acquirer
34b principal terminal determiner

The invention claimed is:

1. A pedestrian terminal device configured to be carried by a pedestrian for performing a pedestrian-vehicle communication with an in-vehicle terminal device mounted on a vehicle, the pedestrian terminal device comprising:
a pedestrian-vehicle communicator for performing a pedestrian-vehicle communication with the in-vehicle terminal device;
a pedestrian-pedestrian communicator for performing a short-range wireless communication with a second pedestrian terminal device, the short-range wireless communication being of a shorter range and a smaller power output than the pedestrian-vehicle communication; and
a controller for selecting from a principal terminal operation mode wherein the pedestrian-vehicle communication with the in-vehicle terminal device is performed in representation of other pedestrian terminal devices, and an in-group terminal operation mode wherein the short-range wireless communication is performed with the second pedestrian terminal device that operates in the principal terminal operation mode;
wherein, when the principal terminal operation mode is selected, the controller:
transmits, as a first broadcast to the other pedestrian terminal devices, a first principal terminal communication status notification that includes position information on the pedestrian terminal device;
receives, from the other pedestrian terminal devices that receive the first principal terminal communication status notification, principal terminal communication request notifications that are broadcast and include position information on the other pedestrian terminal devices;
calculates, in response to receiving the principal terminal communication request notifications, distances to the other pedestrian terminal devices that broadcast the principal terminal communication request notifications based on the position information on the other pedestrian terminal devices included in the principal terminal communication request notifications;
transmits, as a second broadcast to those of the other pedestrian terminal devices that are located within a predetermined distance from the pedestrian terminal device out of the other pedestrian terminal devices that broadcast the principal terminal communication request notifications, a second principal terminal communication status notification that includes IDs of those of the other pedestrian terminal devices that are located within the predetermined distance; and
performs the pedestrian-vehicle communication with the in-vehicle terminal device, representing those of the other pedestrian terminal devices which have the IDs included in the second principal terminal communication status notification.

2. The pedestrian terminal device according to claim 1, wherein the controller is configured to select the in-group terminal operation mode when a third principal terminal communication status notification including an ID of the pedestrian terminal device is received from one of the other pedestrian terminal devices.

3. The pedestrian terminal device according to claim 1, wherein the controller is configured to stop the pedestrian-vehicle communication performed by the pedestrian-vehicle communicator when the in-group terminal operation mode is selected.

4. The pedestrian terminal device according to claim 3, wherein, when the in-group terminal operation mode is canceled, the controller resumes the pedestrian-vehicle communication performed by the pedestrian-vehicle communicator.

5. The pedestrian terminal device according to claim 1, wherein, when the principal terminal operation mode is selected, the controller is configured to monitor, at a regular interval, the principal terminal communication request notifications from the other pedestrian terminal devices, and to cancel the principal terminal operation mode upon failing to receive a principal terminal communication request notification for a predetermined time period.

6. The pedestrian terminal device according to claim 1, wherein when the in-group terminal operation mode is selected, the controller is configured to monitor, at a regular interval, a third principal terminal communication status notification from the second pedestrian terminal device that operates in the principal terminal operation mode, and to cancel the in-group terminal operation mode upon failing to receive the third principal terminal communication status notification for a predetermined time period.

7. The pedestrian terminal device according to claim 1, wherein, when the principal terminal operation mode is selected, the pedestrian-pedestrian communicator receives pedestrian information including pedestrian position information from the other pedestrian terminal devices, and the pedestrian-vehicle communicator transmits the pedestrian information including the pedestrian position information received from the other pedestrian terminal devices or group information including in-group terminal information to the in-vehicle terminal device.

8. The pedestrian terminal device according to claim 1, wherein the controller is configured to select one of the principal terminal operation mode and the in-group terminal operation mode according to a manual input from a user.

9. The pedestrian terminal device according to claim 1, wherein the controller is configured to select one of the principal terminal operation mode and the in-group terminal operation mode according to remaining battery charge information or battery charging information of the pedestrian terminal device or the other pedestrian terminal devices.

10. The pedestrian terminal device according to claim 1, wherein the controller is configured to select one of the principal terminal operation mode and the in-group terminal operation mode according to whether a user of the pedestrian terminal device or users of the other pedestrian terminal devices are riding a walking assistance vehicle or a personal mobility vehicle, or whether the pedestrian terminal device or the other pedestrian terminal devices are mounted on a walking assistance vehicle or a personal mobility vehicle.

11. The pedestrian terminal device according to claim 1, wherein the controller is configured to select one of the principal terminal operation mode and the in-group terminal operation mode according to a command from a fixed terminal device positioned by a road, the command being received by the pedestrian-vehicle communicator or the pedestrian-pedestrian communicator.

12. The pedestrian terminal device according to claim 1, wherein the controller is configured to select the principal terminal operation mode when a principal terminal designation notification is received by the pedestrian-vehicle communicator from the in-vehicle terminal device.

13. The pedestrian terminal device according to claim 12, wherein the pedestrian-vehicle communicator is configured to transmit attribute information regarding a use status of the pedestrian terminal device to the in-vehicle terminal device.

14. The pedestrian terminal device according to claim 12, wherein the pedestrian-vehicle communicator is configured to transmit attribute information regarding a remaining battery charge of the pedestrian terminal device to the in-vehicle terminal device.

15. A pedestrian-vehicle communication system, comprising:
the pedestrian terminal devices according to claim 12; and
the in-vehicle terminal device mounted on the vehicle, the in-vehicle terminal device being configured to determine a principal terminal that performs the pedestrian-vehicle communication in representation of the other pedestrian terminal devices according to attribute information obtained via the pedestrian-vehicle communication with the principal terminal and the other pedestrian terminal devices.

16. A pedestrian-vehicle communication system, comprising:
the pedestrian terminal device according to claim 1; and
the in-vehicle terminal device mounted on the vehicle, the in-vehicle terminal device being configured to perform the pedestrian-vehicle communication with the pedestrian terminal device.

17. A pedestrian-vehicle communication method to be executed by a pedestrian terminal device, the pedestrian terminal device configured to be carried by a pedestrian to perform a pedestrian-vehicle communication with an in-vehicle terminal device mounted on a vehicle, the pedestrian-vehicle communication method comprising:
selecting from a principal terminal operation mode wherein the pedestrian-vehicle communication with the in-vehicle terminal device is performed in representation of other pedestrian terminal devices, and an in-group terminal operation mode wherein a short-range wireless communication is performed with a second pedestrian terminal device, the short-range wireless communication being of a shorter range and a smaller power output than the pedestrian-vehicle communication, the second pedestrian terminal device operating in the principal terminal operation mode; and when the principal terminal operation mode is selected:

transmitting, as a first broadcast to the other pedestrian terminal devices, a first principal terminal communication status notification that includes position information on the pedestrian terminal device;

receiving, from the other pedestrian terminal devices that receive the first principal terminal communication status notification, principal terminal communication request notifications that are broadcast and include position information on the other pedestrian terminal devices;

calculating, in response to receiving the principal terminal communication request notifications, distances to the other pedestrian terminal devices that broadcast the principal terminal communication request notifications based on the position information on the other pedestrian terminal devices included in the principal terminal communication request notifications;

transmitting, as a second broadcast to those of the other pedestrian terminal devices that are located within a predetermined distance from the pedestrian terminal device out of the other pedestrian terminal devices that broadcast the principal terminal communication request notifications, a second principal terminal communication status notification that includes IDs of those of the other pedestrian terminal devices that are located within the predetermined distance, and performing the pedestrian-vehicle communication with the in-vehicle terminal device representing those of the other pedestrian terminal devices which have the IDs included in the second principal terminal communication status notification.

18. The pedestrian-vehicle communication method according to claim 17, further comprising:
upon receiving a third principal terminal communication status notification that includes an ID of the pedestrian terminal device from one of the other pedestrian terminal devices, selecting the in-group terminal operation mode.

* * * * *